United States Patent
Wang et al.

(10) Patent No.: US 10,158,503 B2
(45) Date of Patent: Dec. 18, 2018

(54) METHOD FOR DETERMINING STORAGE LOCATION OF TABLE, FORWARDING DEVICE, AND CONTROLLER

(71) Applicant: Huawei Technologies Co., Ltd., Shenzhen (CN)

(72) Inventors: Xiaozhong Wang, Beijing (CN); Jun Gong, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 172 days.

(21) Appl. No.: 15/274,943

(22) Filed: Sep. 23, 2016

(65) Prior Publication Data

US 2017/0012800 A1    Jan. 12, 2017

Related U.S. Application Data

(63) Continuation of application No. PCT/CN2014/073940, filed on Mar. 24, 2014.

(51) Int. Cl.
*H04L 12/64* (2006.01)
*H04L 12/741* (2013.01)
*H04L 12/751* (2013.01)

(52) U.S. Cl.
CPC .......... *H04L 12/6418* (2013.01); *H04L 45/74* (2013.01); *H04L 45/02* (2013.01)

(58) Field of Classification Search
None
See application file for complete search history.

(56) References Cited

U.S. PATENT DOCUMENTS 8,611,355 B1 * 12/2013 Sella .................. H04L 45/02
370/392
2009/0103536 A1    4/2009 Basso et al.
(Continued)

FOREIGN PATENT DOCUMENTS

CN    1929451 A    3/2007
CN    101355492 A    1/2009
(Continued)

OTHER PUBLICATIONS

OpenFlow Switch Specification Version 1.3.0 (Wire Protocol 0x04), ONF TS-006, Open Networking Foundation, Jun. 25, 2012, 106 pages.
(Continued)

*Primary Examiner* — Kodzovi Acolatse
(74) *Attorney, Agent, or Firm* — Slater Matsil, LLP

(57) ABSTRACT

A method includes receiving, by a forwarding device, M pieces of description information that are sent by a controller and are in a one-to-one correspondence with M forwarding services. Each piece of description information includes preset performance of a corresponding forwarding service and an identifier of a table to be searched, and a set including preset performance of the M forwarding services includes Q elements. The method further includes generating Q pieces of simultaneous access information according to the M pieces of description information; and determining, according to the Q pieces of simultaneous access information, that N tables are to be stored in at least one memory of the forwarding device.

18 Claims, 12 Drawing Sheets

(56) References Cited

U.S. PATENT DOCUMENTS

2010/0036954 A1\* 2/2010 Sakata ................ H04L 12/6418
709/226
2010/0215047 A1 8/2010 Filsfils et al.
2013/0262698 A1\* 10/2013 Schwan ................ H04L 45/00
709/242

FOREIGN PATENT DOCUMENTS

| CN | 102340445 A | 2/2012 |
| CN | 103064901 A | 4/2013 |
| CN | 103491006 A | 1/2014 |

OTHER PUBLICATIONS

Fong Pong et al., "SUSE: Superior Storage-Efficiency for Routing Tables Through Prefix Transformation and Aggregation" IEEE/ACM Transactions on Networking, vol. 18, No. 1, Feb. 1, 2010, pp. 81-94.

\* cited by examiner

A forwarding device receives M pieces of description information sent by a controller, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$ ⟶ 101

The forwarding device generates Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r \times$line rate ⟶ 102

The forwarding device determines, according to the Q pieces of simultaneous access information, that the N tables are to be stored in at least one memory of the forwarding device ⟶ 103

The forwarding device stores the N tables in the at least one memory ⟶ 104

FIG. 1

$$\begin{bmatrix} 1 & 1 & 0 & 1 & 1 & 0 & 1 & 1 & 0 & 1 & 1 & 0 & 1 & 1 & 0 \\ 1 & 1 & 0 & 1 & 1 & 0 & 1 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \\ 1 & 1 & 0 & 1 & 1 & 0 & 1 & 0 & 0 & 0 & 0 & 0 & 0 & 0 & 0 \\ 1 & 1 & 0 & 1 & 1 & 0 & 1 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \\ 1 & 1 & 0 & 1 & 1 & 0 & 1 & 0 & 0 & 0 & 0 & 0 & 0 & 0 & 0 \\ 1 & 0 & 0 & 0 & 0 & 0 & 1 & 1 & 0 & 1 & 1 & 0 & 1 & 1 & 0 \\ 1 & 0 & 0 & 0 & 0 & 0 & 1 & 1 & 0 & 1 & 0 & 0 & 0 & 0 & 0 \\ 0 & 0 & 0 & 0 & 0 & 0 & 0 & 0 & 0 & 0 & 0 & 0 & 0 & 0 & 0 \\ 1 & 0 & 0 & 0 & 0 & 0 & 1 & 1 & 0 & 1 & 0 & 0 & 0 & 0 & 0 \\ 1 & 0 & 0 & 0 & 0 & 0 & 1 & 0 & 0 & 0 & 1 & 0 & 1 & 1 & 0 \\ 0 & 0 & 0 & 0 & 0 & 0 & 0 & 0 & 0 & 0 & 0 & 0 & 0 & 0 & 0 \\ 1 & 0 & 0 & 0 & 0 & 0 & 1 & 0 & 0 & 0 & 1 & 0 & 1 & 1 & 0 \\ 1 & 0 & 0 & 0 & 0 & 0 & 1 & 0 & 0 & 0 & 1 & 0 & 1 & 1 & 0 \\ 0 & 0 & 0 & 0 & 0 & 0 & 0 & 0 & 0 & 0 & 0 & 0 & 0 & 0 & 0 \end{bmatrix}$$

$$\begin{bmatrix} 1 & 1 & 1 & 1 & 1 & 1 & 1 & 1 & 1 & 1 & 1 & 0 & 0 & 0 & 0 & 0 \\ 1 & 1 & 1 & 1 & 1 & 1 & 1 & 0 & 0 & 0 & 0 & 0 & 0 & 0 & 0 & 0 \\ 1 & 1 & 1 & 1 & 1 & 1 & 1 & 0 & 0 & 0 & 0 & 0 & 0 & 0 & 0 & 0 \\ 1 & 1 & 1 & 1 & 1 & 1 & 1 & 0 & 0 & 0 & 0 & 0 & 0 & 0 & 0 & 0 \\ 1 & 1 & 1 & 1 & 1 & 1 & 1 & 0 & 0 & 0 & 0 & 0 & 0 & 0 & 0 & 0 \\ 1 & 1 & 1 & 1 & 1 & 1 & 1 & 0 & 0 & 0 & 0 & 0 & 0 & 0 & 0 & 0 \\ 1 & 1 & 1 & 1 & 1 & 1 & 1 & 0 & 0 & 0 & 0 & 0 & 0 & 0 & 0 & 0 \\ 1 & 0 & 0 & 0 & 0 & 0 & 0 & 1 & 1 & 1 & 1 & 0 & 0 & 0 & 0 & 0 \\ 1 & 0 & 0 & 0 & 0 & 0 & 0 & 1 & 1 & 1 & 1 & 0 & 0 & 0 & 0 & 0 \\ 1 & 0 & 0 & 0 & 0 & 0 & 0 & 1 & 1 & 1 & 1 & 0 & 0 & 0 & 0 & 0 \\ 1 & 0 & 0 & 0 & 0 & 0 & 0 & 1 & 1 & 1 & 1 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{bmatrix}$$

FIG. 10

$$\begin{bmatrix} 1 & 0 & 0 & 0 & 1 & 0 & 0 & 0 & 0 & 0 & 0 & 0 & 0 & 0 & 0 & 0 \end{bmatrix}$$

FIG. 11

$$\begin{bmatrix} 1 & 0 & 0 & 1 & 1 & 0 & 0 & 0 & 0 & 0 & 0 & 0 & 0 & 0 & 0 & 0 \end{bmatrix}$$

FIG. 12

METHOD FOR DETERMINING STORAGE LOCATION OF TABLE, FORWARDING DEVICE, AND CONTROLLER

CROSS-REFERENCE TO RELATED APPLICATIONS

This application is a continuation of International Application No. PCT/CN2014/073940, filed on Mar. 24, 2014, the disclosure of which is hereby incorporated by reference in its entirety.

TECHNICAL FIELD

The application relates to the communications field, and in particular embodiments, to a method for determining a storage location of a table, a forwarding device, and a controller.

BACKGROUND

In the communications field, an existing forwarding device may run multiple forwarding services simultaneously, and to implement one forwarding service, the forwarding device needs to search at least one table. The forwarding device may be a router, and the at least one table may include a forward information base (FIB for short). Each forwarding service of the multiple forwarding services is corresponding to one type of preset performance, where the preset performance may be a half or a quarter of a line rate, and the preset performance may be a maximum value of actual performance that the forwarding device allows a corresponding forwarding service to reach. When the forwarding device runs the multiple forwarding services simultaneously, each forwarding service of the multiple forwarding services is corresponding to one type of actual performance, where the actual performance of each forwarding service is less than or equal to corresponding preset performance. In the prior art, there is a large difference between actual performance of a forwarding service and preset performance of the forwarding service.

SUMMARY

The application provide a method for determining a storage location of a table, which helps to make actual performance of a forwarding service close to preset performance as much as possible.

According to a first aspect, a method for determining a storage location of a table is provided, where the method includes the following. Receiving, by a forwarding device, M pieces of description information sent by a controller, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$. Generating, by the forwarding device, Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r \times$line rate. Determining, by the forwarding device according to the Q pieces of simultaneous access information, that the N tables are to be stored in at least one memory of the forwarding device; and storing, by the forwarding device, the N tables in the at least one memory.

In a first possible implementation manner of the first aspect, the Q pieces of simultaneous access information are Q N×N matrices, and an element of each N×N matrix in the Q N×N matrices is 1 or 0; and if an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$line rate; where i and j are positive integers, and both i and j are less than or equal to N.

According to the first possible implementation manner of the first aspect, in a second possible implementation manner of the first aspect, the determining, by the forwarding device according to the Q pieces of simultaneous access information, that the N tables are to be stored in at least one memory of the forwarding device includes: determining that each table in the N tables is to be stored in the at least one memory of the forwarding device; where determining, by the forwarding device, that an $m^{th}$ table in the N tables is to be stored in the at least one memory of the forwarding device includes:

determining, by the forwarding device, whether each table in the N tables has been stored in a first memory in the at least one memory, where a 1×N matrix is used to indicate whether each table in the N tables has been stored in the first memory, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory;

performing, by the forwarding device, an AND operation on an element in an $m^{th}$ row of each N×N matrix in the Q N×N matrices and a corresponding element in the 1×N matrix, and determining a quantity of results that are 1, where a quantity of is in results of AND operations performed between elements in an $m^{th}$ row of the $r^{th}$ N×N matrix in the Q N×N matrices and corresponding elements in the 1×N matrix is $P_r$; and determining, by the forwarding device based on $\max((P_1+1) \times C_1 \times A, \ldots, (P_Q+1) \times C_Q \times A) \leq B$, that the $m^{th}$ table in the N tables is to be stored in the first memory; where m is a positive integer less than or equal to N; $P_r$ is a nonnegative integer, and $P_r$<N; and A and B are positive numbers, where A indicates bandwidth that needs to be occupied by a forwarding service whose actual performance is a line rate, and B indicates maximum bandwidth that can be provided by the first memory.

According to the first aspect, the first possible implementation manner of the first aspect, or the second possible implementation manner of the first aspect, in a third possible implementation manner of the first aspect, the method further includes:

generating, by the forwarding device, a first message when the forwarding device determines, according to the Q pieces of simultaneous access information, that an $a^{th}$ table in the N tables cannot be stored in the at least one memory, where the first message is used to announce that the forwarding device determines that the $a^{th}$ table in the N tables cannot be stored in the at least one memory; and sending, by the forwarding device, the first message to the controller; where a is a positive integer, and a is less than or equal to N.

According to the third possible implementation manner of the first aspect, in a fourth possible implementation manner of the first aspect, the method further includes:

receiving, by the forwarding device, a second message sent by the controller, where the second message is used to instruct the forwarding device to make the best effort to store the $a^{th}$ table in the N tables;

operating, by the forwarding device, in a best-effort mode according to the second message, and determining that the $a^{th}$ table in the N tables is to be stored in a second memory in the at least one memory;

generating, by the forwarding device, a third message, where the third message is used to announce actual performance of a forwarding service supported by the $a^{th}$ table in the N tables when the forwarding device determines that the $a^{th}$ table in the N tables is to be stored in the second memory; and sending, by the forwarding device, the third message to the controller.

According to a second aspect, a method for determining a storage location of a table is provided, where the method includes:

generating, by a controller, M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r\times$line rate, M, N, Q, and r are positive integers, 2≤N, Q≤M, r≤Q, and $0 \leq C_r \leq 1$; and sending, by the controller, the M pieces of description information to a forwarding device.

In a first possible implementation manner of the second aspect, the M pieces of description information are used to enable the forwarding device to determine that the N tables are to be stored in at least one memory of the forwarding device; and the method further includes:

receiving, by the controller, a first message sent by the forwarding device, where the first message is used to announce that the forwarding device determines that a $j^{th}$ table in the N tables cannot be stored in the at least one memory of the forwarding device; where j is a positive integer, and j is less than or equal to N.

According to the first possible implementation manner of the second aspect, in a second possible implementation manner of the second aspect, the method further includes:

generating, by the controller, a second message, where the second message is used to instruct the forwarding device to make the best effort to store the $j^{th}$ table in the N tables;

sending, by the controller, the second message to the forwarding device, so that the forwarding device operates in a best-effort mode and determines that the $j^{th}$ table in the N tables is to be stored in a second memory in the at least one memory; and receiving, by the controller, a third message sent by the forwarding device, where the third message is used to announce actual performance of a forwarding service supported by the $j^{th}$ table in the N tables when the forwarding device determines that the $j^{th}$ table in the N tables is to be stored in the second memory.

According to a third aspect, a method for determining a storage location of a table is provided, where the method includes:

receiving, by a forwarding device, Q pieces of simultaneous access information sent by a controller, where an $r^{th}$ piece of simultaneous access information in the Q pieces of simultaneous access information indicates whether every two tables in N tables need to be accessed by a same forwarding service whose preset performance is a $C_r\times$line rate, and the N tables need to be searched to execute M forwarding services;

determining, by the forwarding device according to the Q pieces of simultaneous access information, that the N tables are to be stored in at least one memory of the forwarding device; and storing, by the forwarding device, the N tables in the at least one memory.

In a first possible implementation manner of the third aspect, the Q pieces of simultaneous access information are Q N×N matrices, and an element of each N×N matrix in the Q N×N matrices is 1 or 0; and if an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r\times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r\times$line rate; where i and j are positive integers, and both i and j are less than or equal to N.

According to the first possible implementation manner of the third aspect, in a second possible implementation manner of the third aspect, the determining, by the forwarding device according to the Q pieces of simultaneous access information, that the N tables are to be stored in at least one memory of the forwarding device includes: determining that each table in the N tables is to be stored in the at least one memory of the forwarding device; where determining, by the forwarding device, that an $m^{th}$ table in the N tables is to be stored in the at least one memory of the forwarding device includes:

determining, by the forwarding device, whether each table in the N tables has been stored in a first memory in the at least one memory, where a 1×N matrix is used to indicate whether each table in the N tables has been stored in the first memory, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory;

performing, by the forwarding device, an AND operation on an element in an $m^{th}$ row of each N×N matrix in the Q N×N matrices and a corresponding element in the 1×N matrix, and determining a quantity of results that are 1, where a quantity of is in results of AND operations performed between elements in an $m^{th}$ row of the $r^{th}$ N×N matrix in the Q N×N matrices and corresponding elements in the 1×N matrix is $P_r$; and determining, by the forwarding device based on $\max((P_1+1)\times C_1\times A, \ldots, (P_Q+1)\times C_Q\times A)\leq B$, that the $m^{th}$ table in the N tables is to be stored in the first memory; where m is a positive integer less than or equal to N; $P_r$ is a nonnegative integer, and $P_r<N$; and A and B are positive numbers, where A indicates bandwidth that needs to be occupied by a forwarding service whose actual performance is a line rate, and B indicates maximum bandwidth that can be provided by the first memory.

According to the third aspect, the first possible implementation manner of the third aspect, or the second possible implementation manner of the third aspect, in a third possible implementation manner of the third aspect, the method further includes:

generating, by the forwarding device, a first message when the forwarding device determines, according to the Q pieces of simultaneous access information, that an $a^{th}$ table in the N tables cannot be stored in the at least one memory, where the first message is used to announce that the forwarding device determines that the $a^{th}$ table in the N tables cannot be stored in the at least one memory; and sending, by the forwarding device, the first message to the controller; where a is a positive integer, and a is less than or equal to N.

According to the third possible implementation manner of the third aspect, in a fourth possible implementation manner of the third aspect, the method further includes:

receiving, by the forwarding device, a second message sent by the controller, where the second message is used to instruct the forwarding device to make the best effort to store the $a^{th}$ table in the N tables;

operating, by the forwarding device, in a best-effort mode according to the second message, and determining that the $a^{th}$ table in the N tables is to be stored in a second memory in the at least one memory;

generating, by the forwarding device, a third message, where the third message is used to announce actual performance of a forwarding service supported by the $a^{th}$ table in the N tables when the forwarding device determines that the $a^{th}$ table in the N tables is to be stored in the second memory; and sending, by the forwarding device, the third message to the controller.

According to a fourth aspect, a method for determining a storage location of a table is provided, where the method includes:

generating, by a controller, M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r\times$line rate, M, N, Q, and r are positive integers, $2\leq N$, $Q\leq M$, $r\leq Q$, and $0\leq C_r\leq 1$;

generating, by the controller, Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r\times$line rate; and sending, by the controller, the Q pieces of simultaneous access information to a forwarding device.

In a first possible implementation manner of the fourth aspect, the Q pieces of simultaneous access information are Q N×N matrices, and an element of each N×N matrix in the Q N×N matrices is 1 or 0; and if an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r\times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r\times$line rate; where i and j are positive integers, and both i and j are less than or equal to N.

According to the fourth aspect or the first possible implementation manner of the fourth aspect, in a second possible implementation manner of the fourth aspect, the M pieces of description information are used to enable the forwarding device to determine that the N tables are to be stored in at least one memory of the forwarding device; and the method further includes:

receiving, by the controller, a first message sent by the forwarding device, where the first message is used to announce that the forwarding device determines that an $a^{th}$ table in the N tables cannot be stored in the at least one memory of the forwarding device; where a is a positive integer, and a is less than or equal to N.

According to the second possible implementation manner of the fourth aspect, in a third possible implementation manner of the fourth aspect, the method further includes:

generating, by the controller, a second message, where the second message is used to instruct the forwarding device to make the best effort to store the $a^{th}$ table in the N tables;

sending, by the controller, the second message to the forwarding device, so that the forwarding device operates in a best-effort mode and determines that the $a^{th}$ table in the N tables is to be stored in a second memory in the at least one memory; and receiving, by the controller, a third message sent by the forwarding device, where the third message is used to announce actual performance of a forwarding service supported by the $a^{th}$ table in the N tables when the forwarding device determines that the $a^{th}$ table in the N tables is to be stored in the second memory.

According to a fifth aspect, a forwarding device is provided, where the forwarding device includes:

a receiving unit, configured to receive M pieces of description information sent by a controller, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$ line rate, M, N, Q, and r are positive integers, $2 \leq N$, $Q \leq M$, $r \leq Q$, and $0 \leq C_r \leq 1$;

a generating unit, configured to generate Q pieces of simultaneous access information according to the M pieces of description information received by the receiving unit, where an $r^{th}$ piece of simultaneous access information in the Q pieces of simultaneous access information indicates whether every two tables in the N tables need to be accessed by a same forwarding service whose preset performance is the $C_r \times$ line rate;

a determining unit, configured to determine, according to the Q pieces of simultaneous access information generated by the generating unit, that the N tables are to be stored in at least one memory of the forwarding device; and a storage unit, configured to store the N tables in the at least one memory determined by the determining unit.

In a first possible implementation manner of the fifth aspect, the Q pieces of simultaneous access information are Q N×N matrices, and an element of each N×N matrix in the Q N×N matrices is 1 or 0; and if an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$ line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$ line rate; where i and j are positive integers, and both i and j are less than or equal to N.

According to the first possible implementation manner of the fifth aspect, in a second possible implementation manner of the fifth aspect, the determining unit is configured to determine that each table in the N tables is to be stored in the at least one memory of the forwarding device; and the determining unit includes a determining subunit that is configured to determine that an $m^{th}$ table in the N tables is to be stored in the at least one memory of the forwarding device, where the determining subunit includes:

a first determining subunit, configured to determine whether each table in the N tables has been stored in a first memory in the at least one memory, where a 1×N matrix is used to indicate whether each table in the N tables has been stored in the first memory, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory;

a second determining subunit, configured to: perform an AND operation on an element in an $m^{th}$ row of each N×N matrix in the Q N×N matrices generated by the generating unit and a corresponding element in the 1×N matrix determined by the first determining subunit, and determine a quantity of results that are 1, where a quantity of is in results of AND operations performed between elements in an $m^{th}$ row of the $r^{th}$ N×N matrix in the Q N×N matrices and corresponding elements in the 1×N matrix is $P_r$; and a third determining subunit, configured to determine, based on $\max((P_1+1) \times C_1 \times A, \ldots, (P_Q+1) \times C_Q \times A) \leq B$, that the $m^{th}$ table in the N tables is to be stored in the first memory; where m is a positive integer less than or equal to N; $P_r$ is a nonnegative integer, and $P_r \leq N$; and A and B are positive numbers, where A indicates bandwidth that needs to be occupied by a forwarding service whose actual performance is a line rate, and B indicates maximum bandwidth that can be provided by the first memory.

According to the fifth aspect, the first possible implementation manner of the fifth aspect, or the second possible implementation manner of the fifth aspect, in a third possible implementation manner of the fifth aspect, the forwarding device further includes a sending unit; where the generating unit is further configured to generate a first message when the determining unit determines that an $a^{th}$ table in the N tables cannot be stored in the at least one memory, where the first message is used to announce that the forwarding device determines that the $a^{th}$ table in the N tables cannot be stored in the at least one memory; and the sending unit is configured to send, to the controller, the first message generated by the generating unit; where a is a positive integer, and a is less than or equal to N.

According to the third possible implementation manner of the fifth aspect, in a fourth possible implementation manner of the fifth aspect, the receiving unit is further configured to receive a second message sent by the controller, where the second message is used to instruct the forwarding device to make the best effort to store the $a^{th}$ table in the N tables;

the determining unit is further configured to: operate in a best-effort mode according to the second message received by the receiving unit, and determine that the $a^{th}$ table in the N tables is to be stored in a second memory in the at least one memory;

the generating unit is further configured to generate a third message, where the third message is used to announce actual performance of a forwarding service supported by the $a^{th}$ table in the N tables when the determining unit determines that the $a^{th}$ table in the N tables is to be stored in the second memory; and the sending unit is further configured to send, to the controller, the third message generated by the generating unit.

According to a sixth aspect, a controller is provided, where the controller includes:

a generating unit, configured to generate M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$; and a sending unit, configured to send, to a forwarding device, the M pieces of description information generated by the generating unit.

In a first possible implementation manner of the sixth aspect, the M pieces of description information are used to enable the forwarding device to determine that the N tables are to be stored in at least one memory of the forwarding device; and the controller further includes:

a receiving unit, configured to receive a first message sent by the forwarding device, where the first message is used to announce that the forwarding device determines that a $j^{th}$ table in the N tables cannot be stored in the at least one memory of the forwarding device; where j is a positive integer, and j is less than or equal to N.

According to the first possible implementation manner of the sixth aspect, in a second possible implementation manner of the sixth aspect, the generating unit is further configured to generate a second message, where the second message is used to instruct the forwarding device to make the best effort to store the $j^{th}$ table in the N tables;

the sending unit is further configured to send, to the forwarding device, the second message generated by the generating unit, so that the forwarding device operates in a best-effort mode and determines that the $j^{th}$ table in the N tables is to be stored in a second memory in the at least one memory; and the receiving unit is further configured to receive a third message sent by the forwarding device, where the third message is used to announce actual performance of a forwarding service supported by the $j^{th}$ table in the N tables when the forwarding device determines that the $j^{th}$ table in the N tables is to be stored in the second memory.

According to a seventh aspect, a forwarding device is provided, where the forwarding device includes:

a receiving unit, configured to receive Q pieces of simultaneous access information sent by a controller, where an $r^{th}$ piece of simultaneous access information in the Q pieces of simultaneous access information indicates whether every two tables in N tables need to be accessed by a same forwarding service whose preset performance is a $C_r \times$line rate, and the N tables need to be searched to execute M forwarding services;

a determining unit, configured to determine, according to the Q pieces of simultaneous access information received by the receiving unit, that the N tables are to be stored in at least one memory of the forwarding device; and a storage unit, configured to store the N tables in the at least one memory determined by the determining unit.

In a first possible implementation manner of the seventh aspect, the Q pieces of simultaneous access information are Q N×N matrices, and an element of each N×N matrix in the Q N×N matrices is 1 or 0; and if an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$line rate; where i and j are positive integers, and both i and j are less than or equal to N.

According to the first possible implementation manner of the seventh aspect, in a second possible implementation manner of the seventh aspect, the determining unit is configured to determine that each table in the N tables is to be stored in the at least one memory of the forwarding device; and the determining unit includes a determining subunit that is configured to determine that an $m^{th}$ table in the N tables is to be stored in the at least one memory of the forwarding device, where the determining subunit includes:

a first determining subunit, configured to determine whether each table in the N tables has been stored in a first memory in the at least one memory, where a 1×N matrix is used to indicate whether each table in the N tables has been stored in the first memory of the forwarding device, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory;

a second determining subunit, configured to: perform an AND operation on an element in an $m^{th}$ row of each N×N matrix in the Q N×N matrices and a corresponding element in the 1×N matrix determined by the first determining subunit, and determine a quantity of results that are 1, where a quantity of is in results of AND operations performed between elements in an $m^{th}$ row of the $r^{th}$ N×N matrix in the Q N×N matrices and corresponding elements in the 1×N matrix is $P_r$; and a third determining subunit, configured to determine, based on $\max((P_1+1)\times C_1\times A, \ldots, (P_Q+1)\times C_Q\times A)\leq B$, that the $m^{th}$ table in the N tables is to be stored in the first memory; where m is a positive integer less than or equal to N; $P_r$ is a nonnegative integer, and $P_r<N$; and A and B are positive numbers, where A indicates bandwidth that needs to be occupied by a forwarding service whose actual performance is a line rate, and B indicates maximum bandwidth that can be provided by the first memory.

According to the seventh aspect, the first possible implementation manner of the seventh aspect, or the second possible implementation manner of the seventh aspect, in a third possible implementation manner of the seventh aspect, the forwarding device further includes a generating unit and a sending unit, where the generating unit is configured to generate a first message when the determining unit determines that an $a^{th}$ table in the N tables cannot be stored in the at least one memory, where the first message is used to announce that the forwarding device determines that the $a^{th}$ table in the N tables cannot be stored in the at least one memory; and the sending unit is configured to send, to the controller, the first message generated by the generating unit; where a is a positive integer, and a is less than or equal to N.

According to the third possible implementation manner of the seventh aspect, in a fourth possible implementation manner of the seventh aspect, the receiving unit is further configured to receive a second message sent by the controller, where the second message is used to instruct the forwarding device to make the best effort to store the $a^{th}$ table in the N tables;

the determining unit is further configured to: operate in a best-effort mode according to the second message received by the receiving unit, and determine that the $a^{th}$ table in the N tables is to be stored in a second memory in the at least one memory;

the generating unit is further configured to generate a third message, where the third message is used to announce actual performance of a forwarding service supported by the $a^{th}$ table in the N tables when the forwarding device determines that the $a^{th}$ table in the N tables is to be stored in the second memory; and the sending unit is further configured to send, to the controller, the third message generated by the generating unit.

According to an eighth aspect, a controller is provided, where the controller includes:

a generating unit, configured to generate M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r\times$line rate, M, N, Q, and r are positive integers, $2\leq N$, $Q\leq M$, $r\leq Q$, and $0\leq C_r\leq 1$; where the generating unit is further configured to generate Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r\times$line rate; and a sending unit, configured to send, to a forwarding device, the Q pieces of simultaneous access information generated by the generating unit.

In a first possible implementation manner of the eighth aspect, the Q pieces of simultaneous access information are Q N×N matrices, and an element of each N×N matrix in the Q N×N matrices is 1 or 0; and if an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r\times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r\times$line rate; where i and j are positive integers, and both i and j are less than or equal to N.

According to the eighth aspect or the first possible implementation manner of the eighth aspect, in a second possible implementation manner of the eighth aspect, the M pieces of description information are used to enable the forwarding device to determine that the N tables are to be stored in at least one memory of the forwarding device; and the controller further includes: a receiving unit, configured to receive a first message sent by the forwarding device, where the first message is used to announce that the forwarding device determines that an $a^{th}$ table in the N tables cannot be stored in the at least one memory of the forwarding device; where a is a positive integer, and a is less than or equal to N.

According to the second possible implementation manner of the eighth aspect, in a third possible implementation manner of the eighth aspect, the generating unit is further configured to generate a second message, where the second message is used to instruct the forwarding device to make the best effort to store the $a^{th}$ table in the N tables;

the sending unit is further configured to send, to the forwarding device, the second message generated by the generating unit, so that the forwarding device operates in a best-effort mode and determines that the $a^{th}$ table in the N tables is to be stored in a second memory in the at least one memory; and the receiving unit is further configured to receive a third message sent by the forwarding device, where the third message is used to announce actual performance of a forwarding service supported by the $a^{th}$ table in the N tables when the forwarding device determines that the $a^{th}$ table in the N tables is to be stored in the second memory.

According to the application, simultaneous access information of a table that needs to be searched to execute a forwarding service is generated according to description information of the forwarding service; and a storage location in the forwarding device in which the table that needs to be searched to execute the forwarding service is to be stored is determined according to the simultaneous access information of the table. A table needs to be searched to execute a forwarding service, and performing a search operation on the table occupies a hardware resource of a forwarding device, for example, occupies bandwidth of a memory of the forwarding device. Actual performance of the forwarding service is constrained by an available hardware resource of the forwarding device, for example, constrained by available bandwidth of the memory of the forwarding device. Two tables in a simultaneous access relationship are both searched when the forwarding service is executed. When a search operation is performed on the two tables, both tables occupy an available hardware resource of the forwarding device, which consequently affects the actual performance of the forwarding service. In the foregoing technical solutions, a factor whether the N tables are in a simultaneous access relationship is considered in determining storage locations of the N tables in the forwarding device. Therefore, a storage location of a table is determined by using the foregoing technical solutions, which helps to make actual performance of a forwarding service close to preset performance as much as possible.

BRIEF DESCRIPTION OF THE DRAWINGS

To describe the technical solutions in the application more clearly, the following briefly introduces the accompanying drawings required for describing the embodiments. Apparently, the accompanying drawings in the following description show merely some embodiments, and a person of ordinary skill in the art may still derive other drawings from these accompanying drawings without creative efforts.

FIG. 1 is a flowchart of a method for determining a storage location of a table according to an embodiment;

FIG. 10 shows a matrix of half-rate simultaneous access information of 16 tables shown in FIG. 6;

FIG. 11 shows an example of a first table storage bitmap of a first memory of a forwarding device according to another embodiment;

FIG. 12 shows an example of a second table storage bitmap obtained after updating of a first memory of a forwarding device according to another embodiment;

DETAILED DESCRIPTION OF ILLUSTRATIVE EMBODIMENTS

Figure 2:
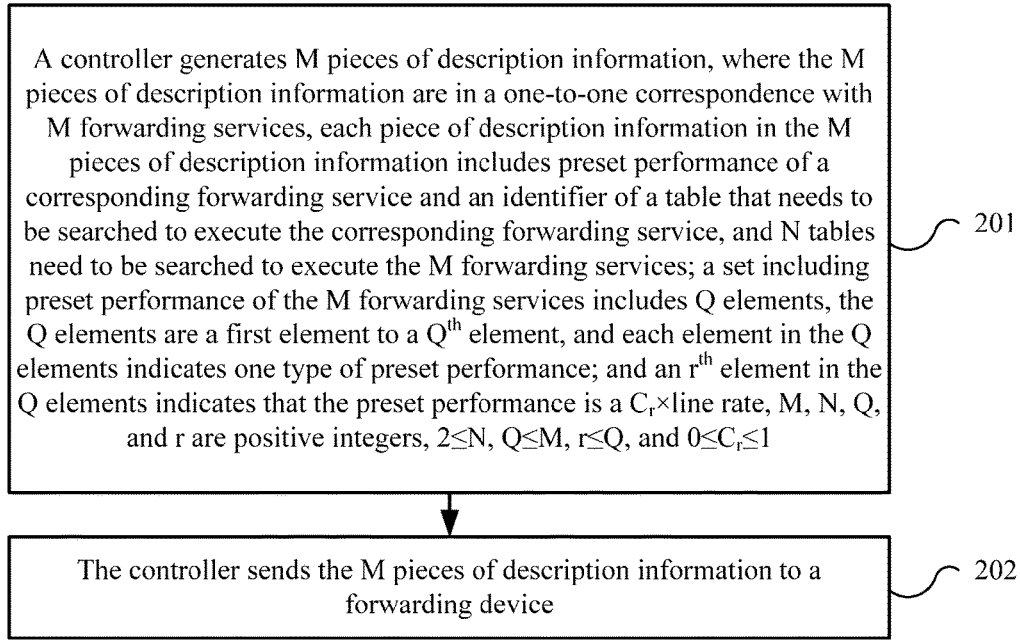
FIG. 2 is a flowchart of a method for determining a storage location of a table according to another embodiment.

The following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope of the present disclosure.

The following embodiments involve a forwarding device and a controller. The forwarding device may be a router, a network switch, a firewall, a load balancer, or a data center. For example, the forwarding device and the controller may be located in a software-defined network (SDN for short). Specifically, the forwarding device may be an SDN switch, and the controller may be an SDN controller. For example, the SDN switch may be an OpenFlow switch, and the SDN controller may be an OpenFlow controller. The OpenFlow switch and the OpenFlow controller may communicate with each other by using a control channel. For the OpenFlow switch, the OpenFlow controller, and the control channel, reference may be made to the OpenFlow Switch Specification version 1.4.0.

Performance involved in the following embodiments may be bandwidth, and the performance is maximum bandwidth that can be implemented by the forwarding device. A person skilled in the art may understand that if the forwarding device runs only one forwarding service, a maximum value of actual performance of the forwarding service may be a line rate.

A forwarding service involved in the following embodiments may be a Layer 2 forwarding service, a Layer 3 forwarding service, a Layer 4 forwarding service, a Multiprotocol Label Switching (MPLS for short) forwarding service, or a virtual private network (VPN for short) forwarding service. The Layer 2 forwarding service may be a Media Access Control (MAC for short) protocol forwarding service. The Layer 3 forwarding service may be an Internet Protocol (IP for short) forwarding service. The Layer 4 forwarding service may be a Transmission Control Protocol (TCP for short) forwarding service or a User Datagram Protocol (UDP) forwarding service. The VPN forwarding service may be a Layer 2 virtual private network (L2VPN for short) forwarding service or a Layer 3 virtual private network (L3VPN for short) forwarding service. The forwarding service can be used to process a packet of a protocol. For example, the MAC protocol forwarding service can be used to process a MAC protocol packet; the IP forwarding service can be used to process an IP packet; the TCP forwarding service can be used to process a TCP packet; and the UDP forwarding service can be used to process a UDP packet.

A table involved in the following embodiments may be a routing table, a MAC protocol table, or an incoming label map (ILM for short) table; or a table involved in the following embodiments may be a subtable that is included in a routing table, a MAC protocol table, or an ILM table. For example, the routing table may include a mapping relationship between a destination IP address and a next hop. The routing table may include a first subtable and a second subtable, where the first subtable may include a mapping relationship between the destination IP address and an index of the next hop, and the second subtable may include a mapping relationship between the index of the next hop and the next hop. A format of the table and content of the table are not limited in the embodiments.

FIG. 1 is a flowchart of a method for determining a storage location of a table according to an embodiment of the present invention. The method shown in FIG. 1 includes the following steps.

101. A forwarding device receives M pieces of description information sent by a controller, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$.

102. The forwarding device generates Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r \times$line rate.

103. The forwarding device determines, according to the Q pieces of simultaneous access information, that the N tables are to be stored in at least one memory of the forwarding device.

104. The forwarding device stores the N tables in the at least one memory.

According to this embodiment, simultaneous access information of a table that needs to be searched to execute a forwarding service is generated according to description information of the forwarding service, where the description information includes preset performance of the forwarding service. It is determined, according to the simultaneous access information of the table, that the table that needs to be searched to execute the forwarding service is to be stored in at least one memory of the forwarding device, which helps to make actual performance of the forwarding service close to the preset performance as much as possible.

In this embodiment, each piece of description information in the M pieces of description information includes preset performance of a forwarding service corresponding to each piece of description information and includes identifiers of all tables that need to be searched to execute the corresponding forwarding service. The preset performance of the corresponding forwarding service may be a line rate, or may be a line rate multiplied by a coefficient, where the coefficient is a value between 0 and 1 (including 0 and 1). The identifier of the table may be a serial number of the table, or may be another identifier of the table, which is not limited in this embodiment.

For example, the M forwarding services may include one or more forwarding services in a Layer 2 forwarding service, a Layer 3 forwarding service, a Layer 4 forwarding service, an MPLS forwarding service, and a VPN forwarding service. The Layer 2 forwarding service may be a MAC protocol forwarding service; the Layer 3 forwarding service may be an IP forwarding service; the Layer 4 forwarding service may be a TCP forwarding service; and the VPN forwarding service may be an L2VPN forwarding service or an L3VPN forwarding service.

For example, the M forwarding services can be used to process packets of M protocols, where the packets of M protocols may be at least one protocol packet of: a MAC protocol packet, an IP packet, a TCP packet, and a UDP packet.

For example, the N tables may include at least two tables of: a routing table, a MAC protocol table, and an ILM table.

It should be noted that a same table may be searched to execute two different forwarding services in the M forwarding services.

Optionally, in an embodiment, in step 101, the forwarding device may receive, by using a control channel, the M pieces of description information sent by the controller, or the forwarding device may receive the M pieces of description information from the controller in another manner, which is not limited in the present disclosure.

Optionally, in another embodiment, in step 101, the forwarding device may receive a control message sent by the controller, where the control message includes the M pieces of description information, which is not limited in the present disclosure.

A type of the preset performance of the forwarding service, that is, a value of Q, is not limited in this embodiment.

Specifically, if Q=1, it indicates that the M forwarding services have same preset performance; for example, the preset performance is the line rate, that is, $C_1=1$; or if Q=3, it indicates that the M forwarding services may be classified into three groups, and forwarding services in each group of forwarding services have same preset performance; for example, three types of preset performance may be the line rate, a half rate, and a slow rate, that is, $C_1=1$, $C_2=0.5$, and $C_3=0$.

Optionally, in an embodiment, in step 102, the Q pieces of simultaneous access information may be represented as Q N×N matrices. An element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$line rate; where i and j are positive integers, and both i and j are less than or equal to N.

For example, when Q=1 and $C_1=1$, it indicates that the preset performance of all the M forwarding services is the line rate. In this case, the Q pieces of simultaneous access information include one N×N matrix, and an element in an $i^{th}$ row and a $j^{th}$ column of the N×N matrix indicates whether both the $i^{th}$ table in the N tables and the $j^{th}$ table in the N tables need to be accessed by at least one service.

For another example, when Q=3, $C_1=1$, $C_2=0.5$, and $C_3=0$, it indicates that preset performance of each forwarding service in the M forwarding services is the line rate, the half rate, or the slow rate, where a 0.5×line rate is also referred to as the half rate. In this case, the Q pieces of simultaneous access information include three N×N matrices. An element in an $i^{th}$ row and a $j^{th}$ column of a first N×N matrix in the three N×N matrices indicates whether both the $i^{th}$ table in the N tables and the $j^{th}$ table in the N tables need to be accessed by at least one forwarding service whose preset performance is the line rate; an element in an $i^{th}$ row and a $j^{th}$ column of a second N×N matrix in the three N×N matrices indicates whether both the $i^{th}$ table in the N tables and the $j^{th}$ table in the N tables need to be accessed by at least one forwarding service whose preset performance is the half rate; and an element in an $i^{th}$ row and a $j^{th}$ column of a third N×N matrix in the three N×N matrices indicates whether both the $i^{th}$ table in the N tables and the $j^{th}$ table in the N tables need to be accessed by at least one forwarding service whose preset performance is the slow rate.

It should be noted that, in this embodiment, the Q pieces of simultaneous access information may also be represented in another form, for example, in a form of an array or in a form of a bitmap, which is not limited in the present disclosure.

In this embodiment, in step 103, the forwarding device first determines an identifier of a table that has been stored in a memory of the forwarding device, determines, according to the Q pieces of simultaneous access information, a simultaneous access relationship between the table that has been stored in the memory and a table that currently needs to be stored, and further determines whether the table that currently needs to be stored can be stored in the memory, where the simultaneous access relationship refers to whether the two tables need to be accessed by a same forwarding service.

Specifically, if preset performance of all forwarding services corresponding to the table stored in the memory can still be satisfied when the table to be stored is stored in the memory, it may be determined that a storage location of the table to be stored is the memory. If preset performance of any forwarding service related to the table stored in the memory cannot be satisfied when the table to be stored is stored in the memory, it may be determined that the table to be stored cannot be stored in the memory, and in this case, it may be assumed that the table to be stored is to be stored in another memory of the forwarding device, and determining similar to that for the memory is performed.

Specifically, the determining, by the forwarding device according to the Q pieces of simultaneous access information, that the N tables are to be stored in at least one memory of the forwarding device in step 103 includes: determining that each table in the N tables is to be stored in the at least one memory of the forwarding device.

The at least one memory of the forwarding device may be one memory, or may be multiple memories. It is assumed that the at least one memory includes a first memory.

Determining whether the table to be stored can be stored in the first memory in the at least one memory includes: determining, according to a simultaneous access relationship between the table to be stored and another table, a table that has been stored in the first memory, and maximum bandwidth that can be provided by the first memory, whether the table to be stored can be stored in the first memory.

Optionally, in an embodiment, determining that an $m^{th}$ table in the N tables is to be stored in the first memory in the at least one memory includes: determining, by the forwarding device, whether each table in the N tables has been stored in the first memory, where a 1×N matrix is used to indicate whether each table in the N tables has been stored in the first memory of the forwarding device, and an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory of the forwarding device, or if the element in the $i^{th}$ column of the 1×N matrix is 0, it indicates that the $i^{th}$ table in the N tables has not been stored in the first memory of the forwarding device; specifically, when any table in the N table has not been stored in the first memory of the forwarding device, an element in each column of the 1×N matrix is 0;

performing, by the forwarding device, an AND operation on an element in an $m^{th}$ row of each N×N matrix in the Q N×N matrices determined in step 102 and a corresponding element in the 1×N matrix, and determining a quantity of results that are 1, where a quantity of is in results of AND operations performed between elements in an $m^{th}$ row of the $r^{th}$ N×N matrix in the Q N×N matrices and corresponding elements in the 1×N matrix is $P_r$, and N elements in the $m^{th}$ row of the $r^{th}$ N×N matrix in the Q N×N matrices are in a one-to-one correspondence with N elements in the 1×N matrix; specifically, among the N elements in the $m^{th}$ row and the N elements in the 1×N matrix, there is a one-to-one correspondence between elements with a same column number; it should be understood that two numbers on which an AND operation is performed are respectively located in the $m^{th}$ row of the $r^{th}$ N×N matrix in the Q N×N matrices and the 1×N matrix, and column numbers of the two numbers are the same; and determining, by the forwarding device based on $\max((P_1+1)\times C_1\times A, \ldots, (P_Q+1)\times C_Q\times A)\leq B$, that the $m^{th}$ table in the N tables is to be stored in the first memory; that is, for Q positive integers from 1 to Q that a value of r ranges, Q corresponding values of $(P_r+1)\times C_r\times A$ can be obtained; when a maximum value in the Q values of $(P_r+1)\times C_r\times A$ is less than or equal to B, it may be determined that a location in which the $m^{th}$ table in the N tables is to be stored is the first memory; it may also be understood that a location in the forwarding device in which the $m^{th}$ table in the N tables is to be stored is the first memory; where m is a positive integer less than or equal to N; $P_r$ is a nonnegative integer, and $P_r<N$; and A and B are positive numbers, where A indicates bandwidth that needs to be occupied by a forwarding service whose actual performance is the line rate, and B indicates maximum bandwidth that can be provided by the first memory.

It may be understood that, it is assumed that the table to be stored is the $m^{th}$ table in the N tables, the forwarding device first determines a table that has been stored in the first memory, and a 1×N matrix is used for indication, where an element in an $m^{th}$ column of the 1×N matrix is 0. When the first memory has not stored any table, all elements in N columns of the 1×N matrix are 0. When the first memory has stored a table, an element in a location that is in the 1×N matrix and is corresponding to the table that has been stored is 1.

Further, after storing the $m^{th}$ table in the N tables in the first memory, the forwarding device updates the element in the $m^{th}$ column of the 1×N matrix from 0 to 1.

For example, when Q=1 and $C_1$=1, it indicates that the preset performance of all the M forwarding services is the line rate. In this case, if the table to be stored is the $m^{th}$ table in the N tables, when $\max((P_1+1)\times A)\leq B$ is satisfied, the forwarding device determines that the $m^{th}$ table in the N tables is to be stored in the first memory.

For another example, when Q=3, $C_1$=1, $C_2$=0.5, and $C_3$=0, it indicates that the preset performance of the M forwarding services is the line rate, the half rate, or the slow rate. In this case, if the table to be stored is the $m^{th}$ table in the N tables, when max(($P_1$+1)×A, ($P_2$+1)×0.5×A, ($P_3$+1)×0×A)=max(($P_1$+1)×A, ($P_2$+1)×0.5×A)≤B is satisfied, the forwarding device determines that the $m^{th}$ table in the N tables is to be stored in the first memory.

In this way, the forwarding device can determine, one by one, a location in which each table in the N tables is to be stored.

Optionally, in an embodiment, when determining, according to the Q pieces of simultaneous access information, that an $a^{th}$ table in the N tables cannot be stored in the at least one memory, the forwarding device may generate a first message, where the first message is used to announce that the forwarding device determines that the $a^{th}$ table in the N tables cannot be stored in the at least one memory. Further, the forwarding device may send the first message to the controller, where a is a positive integer, and a is less than or equal to N.

It may be understood that, if the table to be stored is the $a^{th}$ table in the N tables, when a location in which the $a^{th}$ table is to be stored cannot be determined after the forwarding device traverses all memories in the forwarding device by using the foregoing method, it may be determined that the forwarding device determines that the $a^{th}$ table in the N tables cannot be stored in the at least one memory of the forwarding device.

Optionally, in another embodiment, the forwarding device may receive a second message sent by the controller, where the second message is used to instruct the forwarding device to make the best effort to store the $a^{th}$ table in the N tables. The forwarding device may operate in a best-effort mode according to the second message, and determine that the $a^{th}$ table in the N tables is to be stored in a second memory in the at least one memory. Further, the forwarding device generates a third message, where the third message is used to announce actual performance of a forwarding service supported by the $a^{th}$ table in the N tables when the forwarding device determines that the $a^{th}$ table in the N tables is to be stored in the second memory. Afterward, the forwarding device may send the third message to the controller.

It should be noted that, if the $a^{th}$ table in the N tables needs to be searched to execute multiple forwarding services, the third message should include multiple types of actual performance that are in a one-to-one correspondence with the multiple forwarding services.

It should be noted that the second memory herein may be the first memory or may be another memory that is in the at least one memory and is different from the first memory, which is not limited in the present disclosure.

Specifically, when operating in the best-effort mode, the forwarding device may randomly determine a location in which the $a^{th}$ table in the N tables is to be stored, that is, the second memory may be any memory in the at least one memory.

Alternatively, specifically, when operating in the best-effort mode, the forwarding device may preferentially determine a location in which a table used in a forwarding service with high preset performance is to be stored, which may be understood as follows: the forwarding device preferentially ensures actual performance of a forwarding service with a relatively large $C_r$.

For example, when Q=3, $C_1$=1, $C_2$=0.5, and $C_3$=0, it indicates that the preset performance of each forwarding service in the M forwarding services is the line rate, the half rate, or the slow rate. If the forwarding device determines that the location in which the $a^{th}$ table is to be stored is the second memory and bandwidth of the second memory is B', and when it is assumed that AND operations are performed on elements in an $a^{th}$ row of the first N×N matrix and corresponding elements in a table storage bitmap of the second memory and it is determined that a quantity of results that are 1 is $P_1$, AND operations are performed on elements in an $a^{th}$ row of the second N×N matrix and corresponding elements in the table storage bitmap of the second memory and it is determined that a quantity of results that are 1 is $P_2$, and AND operations are performed on elements in an $a^{th}$ row of the third N×N matrix and corresponding elements in the table storage bitmap of the second memory and it is determined that a quantity of results that are 1 is $P_3$, where $P_1$, $P_2$, and $P_3$ are nonnegative integers less than N, and max(($P_1$+1)×A, ($P_2$+1)×0.5×A, ($P_3$+1)×0×A)>B', the foregoing third message may be used to announce that actual performance of a forwarding service that can be supported when the $a^{th}$ table is to be stored in the second memory is as follows: a forwarding service for which the $a^{th}$ table needs to be searched and whose preset performance is the line rate can actually reach 1/(1+$P_1$) times of the line rate, and a forwarding service for which the $a^{th}$ table needs to be searched and whose preset performance is the half rate can actually reach 2/(1+$P_2$) times of the half rate. Specifically, when operating in the best-effort mode, the forwarding device preferentially selects, for storage, a memory that can ensure actual performance of a forwarding service whose preset performance is the line rate.

According to this embodiment, simultaneous access information of a table that needs to be searched to execute a forwarding service is generated according to description information of the forwarding service, where the description information includes preset performance of the forwarding service; and it is determined, according to the simultaneous access information of the table, that the table that needs to be searched to execute the forwarding service is to be stored in at least one memory of a forwarding device. A location in the forwarding device in which the table is to be stored is determined by using the foregoing technical solution, which helps to make actual performance of the forwarding service close to the preset performance as much as possible.

FIG. 2 is a flowchart of a method for determining a storage location of a table according to another embodiment. The embodiment corresponding to FIG. 2 is a further description of the embodiment corresponding to FIG. 1, and for the embodiment corresponding to FIG. 2, reference may be specifically made to the embodiment corresponding to FIG. 1. Referring to FIG. 2, the method shown in FIG. 2 includes the following steps:

201. A controller generates M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$.

202. The controller sends the M pieces of description information to a forwarding device.

For example, step 202 may include that: the controller sends the M pieces of description information to the forwarding device, so that the forwarding device determines that the N tables that need to be searched to execute the M services are to be stored in at least one memory of the forwarding device.

According to this embodiment, simultaneous access information of a table that needs to be searched to execute a forwarding service is generated according to description information of the forwarding service, where the description information includes preset performance of the forwarding service; and it is determined, according to the simultaneous access information of the table, that the table that needs to be searched to execute the forwarding service is to be stored in at least one memory of a forwarding device. A table needs to be searched to execute a forwarding service, and performing a search operation on the table occupies a hardware resource of a forwarding device, for example, occupies bandwidth of a memory of the forwarding device. Actual performance of the forwarding service is constrained by an available hardware resource of the forwarding device, for example, constrained by available bandwidth of the memory of the forwarding device. Two tables in a simultaneous access relationship are both searched when the forwarding service is executed. When a search operation is performed on the two tables, both tables occupy an available hardware resource of the forwarding device, which consequently affects the actual performance of the forwarding service. In the foregoing technical solution, the M pieces of description information sent by the controller to the forwarding device include the simultaneous access information of the table. Therefore, a factor whether the N tables are in a simultaneous access relationship may be considered when the forwarding device determines storage locations of the N tables in the forwarding device. Therefore, the foregoing technical solution helps to make the actual performance of the forwarding service close to the preset performance as much as possible.

In this embodiment, each piece of description information includes preset performance of a forwarding service corresponding to each piece of description information and identifiers of all tables that need to be searched to execute the corresponding forwarding service. The preset performance of the corresponding forwarding service may be a line rate, or may be a line rate multiplied by a coefficient, where the coefficient is any value between 0 and 1 (including 0 and 1). The identifier of the table may be a serial number of the table, or may be another identifier of the table, which is not limited in the present disclosure.

It should be noted that a same table may be searched to execute two different forwarding services in the M forwarding services.

A type of the preset performance of the forwarding service, that is, a value of Q, is not limited in this embodiment.

Specifically, if Q=1, it indicates that the M forwarding services have same preset performance; for example, the preset performance is the line rate, that is, $C_1=1$; or if Q=3, it indicates that the M forwarding services may be classified into three groups, and forwarding services in each group have same preset performance; for example, three types of preset performance may be the line rate, a half rate, and a slow rate, that is, $C_1=1$, $C_2=0.5$, and $C_3=0$.

In this embodiment, the M pieces of description information may be prestored in the controller by a user of the controller, for example, an operator, or the M pieces of description information may be acquired by the controller from another device or apparatus, which is not limited in the present disclosure.

Optionally, in an embodiment, in step 202, the controller may send the M pieces of description information to the forwarding device by using a control channel, or the controller may send the M pieces of description information to the forwarding device in another manner, which is not limited in the present disclosure.

Optionally, in another embodiment, in step 202, the controller may send a control message to the forwarding device, where the control message includes the M pieces of description information, which is not limited in the present disclosure.

Optionally, in an embodiment, the controller may receive a first message sent by the forwarding device, where the first message is used to announce that the forwarding device determines that a $j^{th}$ table in the N tables cannot be stored in the at least one memory of the forwarding device, and j is a positive integer less than or equal to N.

Optionally, in an embodiment, if the controller does not allow a forwarding service for which the $j^{th}$ table needs to be searched to lower a rate, the controller may not perform further processing after receiving the first message.

Optionally, in another embodiment, if the controller allows a forwarding service for which the $j^{th}$ table needs to be searched to lower a rate, the controller may generate a second message, where the second message is used to instruct the forwarding device to make the best effort to store the $j^{th}$ table. Further, the controller may send the second message to the forwarding device, so that the forwarding device operates in a best-effort mode and determines that the $j^{th}$ table is to be stored in a second memory in the at least one memory of the forwarding device. In addition, the controller may receive a third message sent by the forwarding device, where the third message is used to announce actual performance of a forwarding service supported by the $j^{th}$ table when the forwarding device determines that the $j^{th}$ table is to be stored in the second memory.

It should be noted that description information of a forwarding service in this embodiment may be defined by the user of the controller, for example, the operator. The operator stores the description information of the forwarding service in the controller, and when the operator adds a forwarding service or modifies the description information of the forwarding service, the controller may send the added forwarding service or modified description information of the forwarding service to the forwarding device in real time. Further, the forwarding device may re-determine, according to the added forwarding service or the modified description information of the forwarding service, a location in which a table that needs to be searched to execute the forwarding service is to be stored.

Specifically, when the operator adds a new forwarding service, and the operator defines description information of the new forwarding service at the same time, the controller sends the description information of the new forwarding service to the forwarding device. For example, the operator may add an $(M+1)^{th}$ forwarding service, and description information of the $(M+1)^{th}$ forwarding service may include one or more tables in the foregoing N tables, or may include at least one new table other than the N tables. At the same time, the operator may define that preset performance of the $(M+1)^{th}$ forwarding service is one of the Q elements, or that preset performance of the $(M+1)^{th}$ forwarding service is a $C_{Q+1} \times$line rate.

Specifically, when the operator modifies description information of a forwarding service, a table that needs to be searched to execute the forwarding service may be modified, or preset performance of the forwarding service may be modified; then the controller sends modified description information of the forwarding service to the forwarding device. For example, the operator may modify an $i^{th}$ piece of description information that is in the M pieces of description information and is corresponding to an $i^{th}$ forwarding service, and a table that needs to be searched to execute the $i^{th}$ forwarding service remains unchanged, but preset performance of the $i^{th}$ forwarding service changes; or the operator may modify an $i^{th}$ piece of description information that is in the M pieces of description information and is corresponding to an $i^{th}$ forwarding service, and preset performance of the $i^{th}$ forwarding service remains unchanged, but a quantity of tables that need to be searched to execute the $i^{th}$ forwarding service increases or decreases; or the operator may modify an $i^{th}$ piece of description information that is in the M pieces of description information and is corresponding to an $i^{th}$ forwarding service, and both preset performance of the $i^{th}$ forwarding service and a table that needs to be searched to execute the $i^{th}$ forwarding service change, which is not limited in the present disclosure.

Figure 3:
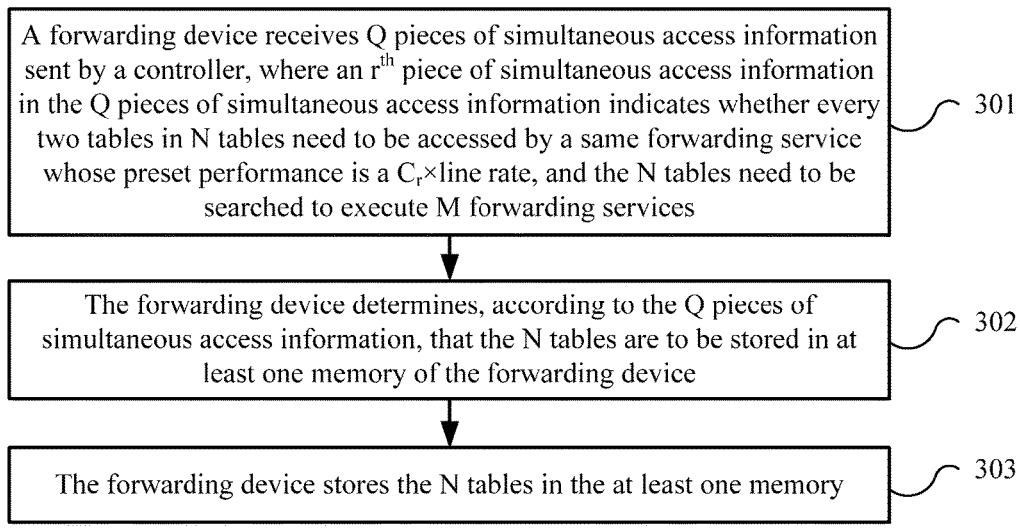
FIG. 3 is a flowchart of a method for determining a storage location of a table according to another embodiment.

FIG. 3 is a flowchart of a method for determining a storage location of a table according to another embodiment. For technical terms involved in the embodiment corresponding to FIG. 3, reference may be made to the embodiment corresponding to FIG. 1. Referring to FIG. 3, the method shown in FIG. 3 includes the following steps:

301. A forwarding device receives Q pieces of simultaneous access information sent by a controller, where an $r^{th}$ piece of simultaneous access information in the Q pieces of simultaneous access information indicates whether every two tables in N tables need to be accessed by a same forwarding service whose preset performance is a $C_r \times$line rate, and the N tables need to be searched to execute M forwarding services.

302. The forwarding device determines, according to the Q pieces of simultaneous access information, that the N tables are to be stored in at least one memory of the forwarding device.

303. The forwarding device stores the N tables in the at least one memory.

According to this embodiment, a forwarding device determines, according to simultaneous access information of a table, that the table is to be stored in at least one memory of the forwarding device, where the simultaneous access information of the table may be determined by a controller according to description information of a forwarding service; and the simultaneous access information of the table is further sent to the forwarding device. Therefore, the foregoing technical solution helps to make actual performance of the forwarding service close to preset performance as much as possible.

Optionally, in an embodiment, in step 301, the Q pieces of simultaneous access information may be represented as Q N×N matrices. An element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$line rate; where i and j are positive integers, and both i and j are less than or equal to N.

For example, when Q=1 and $C_1=1$, it indicates that preset performance of all the M forwarding services is a line rate. In this case, the Q pieces of simultaneous access information may include one N×N matrix, and an element in an $i^{th}$ row and a $j^{th}$ column of the N×N matrix indicates whether both the $i^{th}$ table in the N tables and the $j^{th}$ table in the N tables need to be accessed by at least one service.

For another example, when Q=3, $C_1=1$, $C_2=0.5$, and $C_3=0$, it indicates that preset performance of each forwarding service in the M forwarding services is the line rate, a half rate, or a slow rate, where a 0.5×line rate is also referred to as the half rate. In this case, the Q pieces of simultaneous access information may include three N×N matrices. An element in an $i^{th}$ row and a $j^{th}$ column of a first N×N matrix in the three N×N matrices indicates whether both the $i^{th}$ table in the N tables and the $j^{th}$ table in the N tables need to be accessed by at least one forwarding service whose preset performance is the line rate; an element in an $i^{th}$ row and a $j^{th}$ column of a second N×N matrix in the three N×N matrices indicates whether both the $i^{th}$ table in the N tables and the $j^{th}$ table in the N tables need to be accessed by at least one forwarding service whose preset performance is the half rate; and an element in an $i^{th}$ row and a $j^{th}$ column of a third N×N matrix in the three N×N matrices indicates whether both the $i^{th}$ table in the N tables and the $j^{th}$ table in the N tables need to be accessed by at least one forwarding service whose preset performance is the slow rate.

It should be noted that, in this embodiment, the Q pieces of simultaneous access information may also be represented in another form, for example, in a form of an array or in a form of a bitmap, which is not limited in the present disclosure.

In this embodiment, for step 302, reference may be made to step 103 shown in FIG. 1, and to avoid repetition, details are not described herein again.

Optionally, in an embodiment, when determining, according to the Q pieces of simultaneous access information, that an $a^{th}$ table in the N tables cannot be stored in the at least one memory, the forwarding device may generate a first message, where the first message is used to announce that the forwarding device determines that the $a^{th}$ table in the N tables cannot be stored in the at least one memory. Further, the forwarding device may send the first message to the controller, where a is a positive integer, and a is less than or equal to N.

It may be understood that, if a table to be stored is the $a^{th}$ table in the N tables, when a location in which the $a^{th}$ table is to be stored cannot be determined after the forwarding device traverses all memories in the forwarding device by using the foregoing method, it may be determined that the forwarding device determines that the $a^{th}$ table in the N tables cannot be stored in the at least one memory of the forwarding device.

Optionally, in another embodiment, the forwarding device may receive a second message sent by the controller, where the second message is used to instruct the forwarding device to make the best effort to store the $a^{th}$ table in the N tables. The forwarding device may operate in a best-effort mode according to the second message, and determine that the $a^{th}$ table in the N tables is to be stored in a second memory in the at least one memory. Further, the forwarding device generates a third message, where the third message is used to announce actual performance of a forwarding service supported by the $a^{th}$ table in the N tables when the forwarding device determines that the $a^{th}$ table in the N tables is to be stored in the second memory. Afterward, the forwarding device may send the third message to the controller.

It should be noted that, if the $a^{th}$ table in the N tables needs to be searched to execute multiple forwarding services, the third message should include multiple types of actual performance that are in a one-to-one correspondence with the multiple forwarding services.

It should be noted that the second memory herein may be a first memory or may be another memory that is in the at least one memory and is different from a first memory, which is not limited in the present disclosure.

Specifically, when operating in the best-effort mode, the forwarding device may randomly determine a location in which the $a^{th}$ table in the N tables is to be stored, that is, the second memory may be any memory in the at least one memory.

Alternatively, specifically, when operating in the best-effort mode, the forwarding device may preferentially determine a location in which a table used in a forwarding service with high preset performance is to be stored, which may be understood as follows: the forwarding device preferentially ensures actual performance of a forwarding service with a relatively large $C_r$.

For example, when Q=3, $C_1$=1, $C_2$=0.5, and $C_3$=0, it indicates that the preset performance of each forwarding service in the M forwarding services is the line rate, the half rate, or the slow rate. If the forwarding device determines that the location in which the $a^{th}$ table is to be stored is the second memory and bandwidth of the second memory is B', and when it is assumed that AND operations are performed on elements in an $a^{th}$ row of the first N×N matrix and corresponding elements in a table storage bitmap of the second memory and it is determined that a quantity of results that are 1 is $P_1$, AND operations are performed on elements in an $a^{th}$ row of the second N×N matrix and corresponding elements in the table storage bitmap of the second memory and it is determined that a quantity of results that are 1 is $P_2$, and AND operations are performed on elements in an $a^{th}$ row of the third N×N matrix and corresponding elements in the table storage bitmap of the second memory and it is determined that a quantity of results that are 1 is $P_3$, where $P_1$, $P_2$, and $P_3$ are nonnegative integers less than N, and max(($P_1$+1)×A, ($P_2$+1)×0.5×A, ($P_3$+1)×0×A)>B', the foregoing third message may be used to announce that actual performance of a forwarding service that can be supported when the $a^{th}$ table is to be stored in the second memory is as follows: a forwarding service for which the $a^{th}$ table needs to be searched and whose preset performance is the line rate can actually reach 1/(1+$P_1$) times of the line rate, and a forwarding service for which the $a^{th}$ table needs to be searched and whose preset performance is the half rate can actually reach 2/(1+$P_2$) times of the half rate. Specifically, when operating in the best-effort mode, the forwarding device preferentially selects, for storage, a memory that can ensure actual performance of a forwarding service whose preset performance is the line rate.

According to this embodiment, simultaneous access information of a table that needs to be searched to execute a forwarding service is generated according to description information of the forwarding service, where the description information includes preset performance of the forwarding service; and a storage location in a forwarding device in which the table that needs to be searched to execute the forwarding service is to be stored is determined according to the simultaneous access information of the table and a table that has been stored in a memory of the forwarding device. The location in the forwarding device in which the table is to be stored is determined by using the foregoing technical solution, which helps to make actual performance of the forwarding service close to the preset performance as much as possible.

Figure 4:
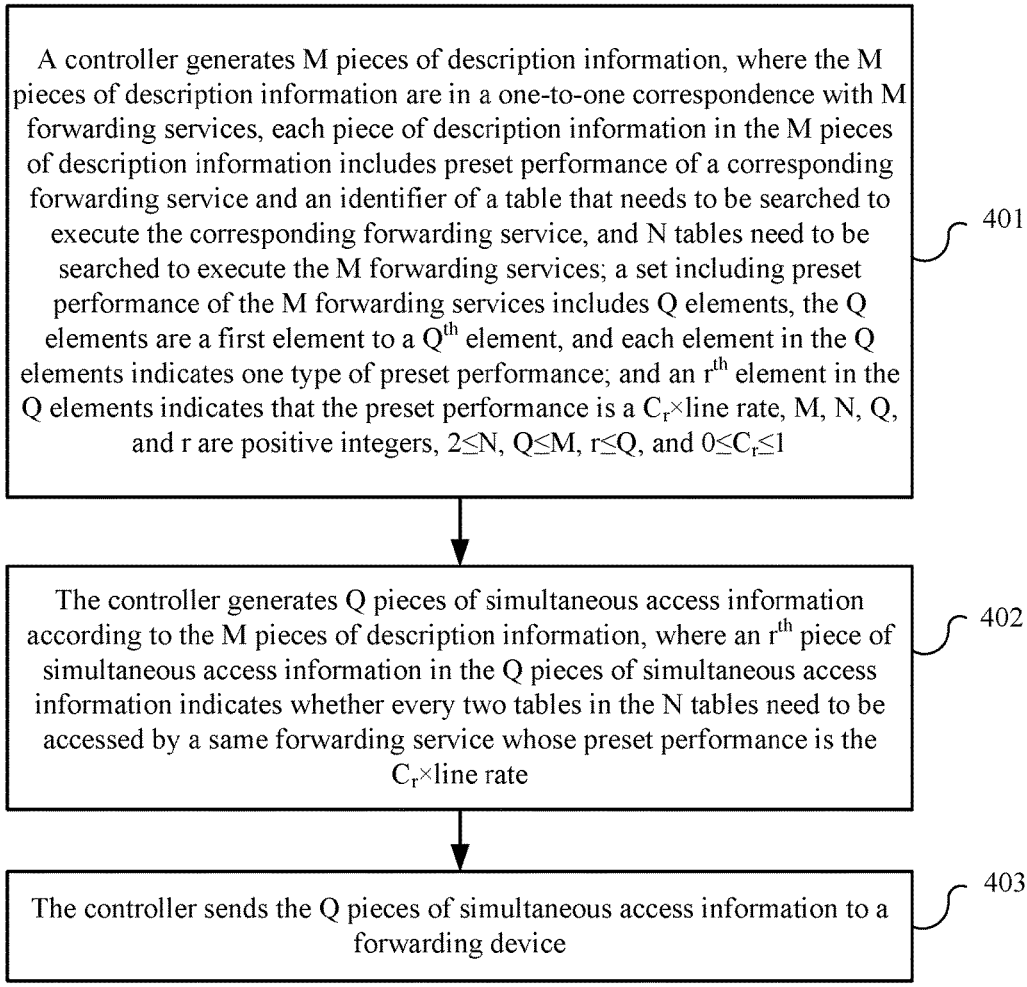
FIG. 4 is a flowchart of a method for determining a storage location of a table according to another embodiment.

FIG. 4 is a flowchart of a method for determining a storage location of a table according to another embodiment. The embodiment corresponding to FIG. 4 is a further description of the embodiment corresponding to FIG. 3. In addition, for technical terms involved in the embodiment corresponding to FIG. 4, reference may be specifically made to the embodiment corresponding to FIG. 1. Referring to FIG. 4, the method shown in FIG. 4 includes the following steps:

401. A controller generates M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r$×line rate, M, N, Q, and r are positive integers, 2≤N, Q≤M, r≤Q, and 0≤$C_r$≤1.

402. The controller generates Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r$×line rate.

403. The controller sends the Q pieces of simultaneous access information to a forwarding device.

According to this embodiment, a controller determines, according to description information of a forwarding service, simultaneous access information of a table that needs to be searched to execute the forwarding service, and further sends the simultaneous access information of the table to a forwarding device, so that the forwarding device can determine, according to the simultaneous access information of the table, that the table is to be stored in at least one memory of the forwarding device. Determining, in this way, a location in the forwarding device in which the table is to be stored helps to make actual performance of the forwarding service close to preset performance as much as possible.

In this embodiment, for step 401, reference may be made to step 201 shown in FIG. 2, and to avoid repetition, details are not described herein again.

Optionally, in an embodiment, in step 402, the Q pieces of simultaneous access information may be represented as Q N×N matrices. An element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r$×line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r$×line rate; where i and j are positive integers, and both i and j are less than or equal to N.

For example, when Q=1 and $C_1$=1, it indicates that the preset performance of all the M forwarding services is a line rate. In this case, the Q pieces of simultaneous access information include one N×N matrix, and an element in an $i^{th}$ row and a $j^{th}$ column of the N×N matrix indicates whether both the $i^{th}$ table in the N tables and the $j^{th}$ table in the N tables need to be accessed by at least one service.

For another example, when Q=3, $C_1$=1, $C_2$=0.5, and $C_3$=0, it indicates that preset performance of each forwarding service in the M forwarding services is the line rate, a half rate, or a slow rate, where a 0.5×line rate is also referred to as the half rate. In this case, the Q pieces of simultaneous access information include three N×N matrices. An element in an $i^{th}$ row and a $j^{th}$ column of a first N×N matrix in the three N×N matrices indicates whether both the $i^{th}$ table in the N tables and the $j^{th}$ table in the N tables need to be accessed by at least one forwarding service whose preset performance is the line rate; an element in an $i^{th}$ row and a $j^{th}$ column of a second N×N matrix in the three N×N matrices indicates whether both the $i^{th}$ table in the N tables and the $j^{th}$ table in the N tables need to be accessed by at least one forwarding service whose preset performance is the half rate; and an element in an $i^{th}$ row and a $j^{th}$ column of a third N×N matrix in the three N×N matrices indicates whether both the $i^{th}$ table in the N tables and the $j^{th}$ table in the N tables need to be accessed by at least one forwarding service whose preset performance is the slow rate.

It should be noted that, in this embodiment, the Q pieces of simultaneous access information may also be represented in another form, for example, in a form of an array, or in a form of a bitmap, which is not limited in the present disclosure.

Optionally, in an embodiment, in step 403, the controller may send the Q pieces of simultaneous access information to the forwarding device by using a control channel, or the controller may send the Q pieces of simultaneous access information to the forwarding device in another manner, which is not limited in the present disclosure.

Optionally, in another embodiment, in step 403, the controller may send a control message to the forwarding device, where the control message includes the Q pieces of simultaneous access information, which is not limited in the present disclosure.

Optionally, in an embodiment, the controller may receive a first message sent by the forwarding device, where the first message is used to announce that the forwarding device determines that an $a^{th}$ table in the N tables cannot be stored in at least one memory of the forwarding device, and a is a positive integer less than or equal to N.

Optionally, in an embodiment, if the controller does not allow a forwarding service for which the $a^{th}$ table needs to be searched to lower a rate, the controller may not perform further processing after receiving the first message.

Optionally, in another embodiment, if the controller allows a forwarding service for which the $a^{th}$ table needs to be searched to lower a rate, the controller may generate a second message, where the second message is used to instruct the forwarding device to make the best effort to store the $a^{th}$ table. Further, the controller may send the second message to the forwarding device, so that the forwarding device operates in a best-effort mode and determines that the $a^{th}$ table is to be stored in a second memory in the at least one memory of the forwarding device. In addition, the controller may receive a third message sent by the forwarding device, where the third message is used to announce actual performance of a forwarding service supported by the $a^{th}$ table when the forwarding device determines that the $a^{th}$ table is to be stored in the second memory.

It should be noted that description information of a forwarding service in this embodiment may be defined and stored in the controller by an operator. When the operator adds a forwarding service or modifies the description information of the forwarding service, the controller may send the added forwarding service or modified description information of the forwarding service to the forwarding device in real time. Further, the forwarding device may re-determine, according to the added forwarding service or the modified description information of the forwarding service, a location in which a table that needs to be searched to execute the forwarding service is to be stored.

Specifically, when the operator adds a new forwarding service, the operator defines description information of the new forwarding service at the same time. If a table that needs to be searched to execute the new forwarding service belongs to the foregoing N tables, the controller re-determines and updates in real time, according to the description information of the new forwarding service, simultaneous access information of the table that needs to be searched to execute the new forwarding service; and further sends, to the forwarding device, updated simultaneous access information of the table that needs to be searched to execute the new forwarding service. If a table other than the foregoing N tables exists in the table that needs to be searched to execute the new forwarding service, the controller needs to re-determine and update in real time, according to the new forwarding service and preset performance of the new forwarding service, simultaneous access information of all tables that need to be searched to execute the new forwarding service; and further sends, to the forwarding device, updated simultaneous access information of all the tables that need to be searched to execute the new forwarding service. For example, the operator may add an $(M+1)^{th}$ forwarding service, and the $(M+1)^{th}$ forwarding service may include multiple tables in the foregoing N tables, or may include at least one new table other than the N tables. At the same time, the operator may define that preset performance of the $(M+1)^{th}$ forwarding service is one of the Q elements, or that preset performance of the $(M+1)^{th}$ forwarding service is a $C_{Q+1}$×line rate. Further, the controller may re-determine and update in real time, according to description information of the $(M+1)^{th}$ forwarding service, simultaneous access information of a table related to the $(M+1)^{th}$ forwarding service, and send, to the forwarding device, the simultaneous access information of the table related to the $(M+1)^{th}$ forwarding service.

Specifically, when the operator modifies description information of a forwarding service, a table that needs to be searched to execute the forwarding service may be modified, or preset performance of the forwarding service may be modified; then the controller re-determines and updates in real time, according to modified description information of the forwarding service, simultaneous access information of a table that needs to be searched to execute the forwarding service that is modified, and further sends, to the forwarding device, updated simultaneous access information of the table that needs to be searched to execute the forwarding service that is modified. For example, the operator may modify an $i^{th}$ piece of description information that is in the M pieces of description information and is corresponding to an $i^{th}$ forwarding service, and a table that needs to be searched to execute the $i^{th}$ forwarding service remains unchanged, but preset performance of the $i^{th}$ forwarding service changes; or the operator may modify an $i^{th}$ piece of description information that is in the M pieces of description information and is corresponding to an $i^{th}$ forwarding service, and preset performance of the $i^{th}$ forwarding service remains unchanged, but a table that needs to be searched to execute the $i^{th}$ forwarding service changes; or the operator may modify an $i^{th}$ piece of description information that is in the M pieces of description information and is corresponding to an $i^{th}$ forwarding service, and both preset performance of the $i^{th}$ forwarding service and a table that needs to be searched to execute the $i^{th}$ forwarding service change, which is not limited in the present disclosure. Further, the controller may re-determine and update, according to modified $i^{th}$ piece of description information, simultaneous access information of a table that needs to be searched to execute the $i^{th}$ forwarding service that is modified, and send, to the forwarding device, the simultaneous access information of the table that needs to be searched to execute the $i^{th}$ forwarding service that is modified.

In this way, in this embodiment, a controller determines, according to description information of a forwarding service, simultaneous access information of a table that needs to be searched to execute the forwarding service, which can implement control of an entire network and reduce calculation consumption of a forwarding device. Further, the forwarding device determines a storage location, in the forwarding device, of the table according to the simultaneous access information of the table, which implements controllability and programmability of the forwarding service and avoids a problem that forwarding performance cannot satisfy a service requirement due to an improper storage location of the table.

In this embodiment, an operator may configure or program performance of a forwarding service properly according to an actual application requirement and a capability of a device, and implement storing in a controller, so that the operator can ensure performance of a service by using less resources.

Figure 5:
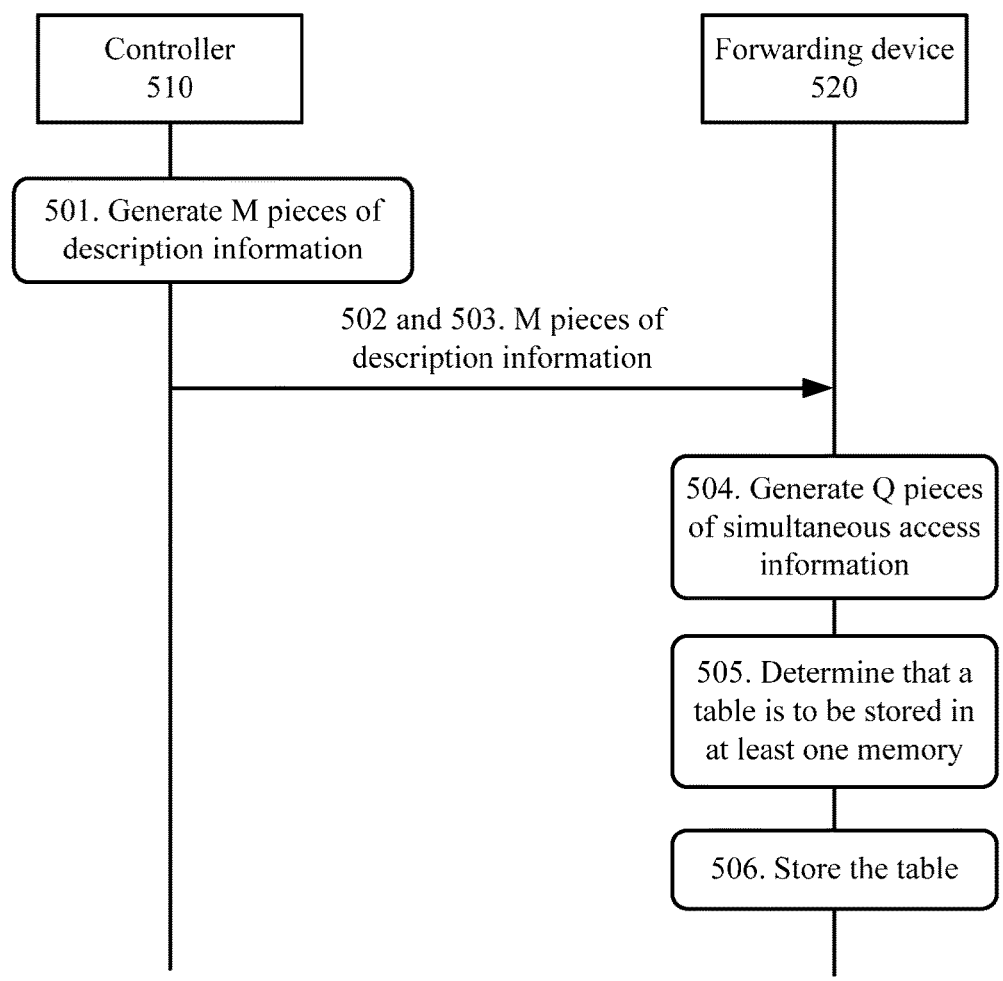
FIG. 5 is a flowchart of a method for determining a storage location of a table according to another embodiment.

FIG. 5 is a flowchart of a method for determining a storage location of a table according to another embodiment. The embodiment corresponding to FIG. 5 may be used to execute the method shown in FIG. 1, and the embodiment corresponding to FIG. 5 may also be used to execute the method shown in FIG. 2. For technical terms involved in the embodiment corresponding to FIG. 1, reference may be made to the embodiment corresponding to FIG. 1. Specifically, the method shown in FIG. 5 includes the following steps:

501. A controller 510 generates M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$.

In this embodiment, for step 501, reference may be made to step 201 shown in FIG. 2, and to avoid repetition, details are not described herein again.

Figure 6:
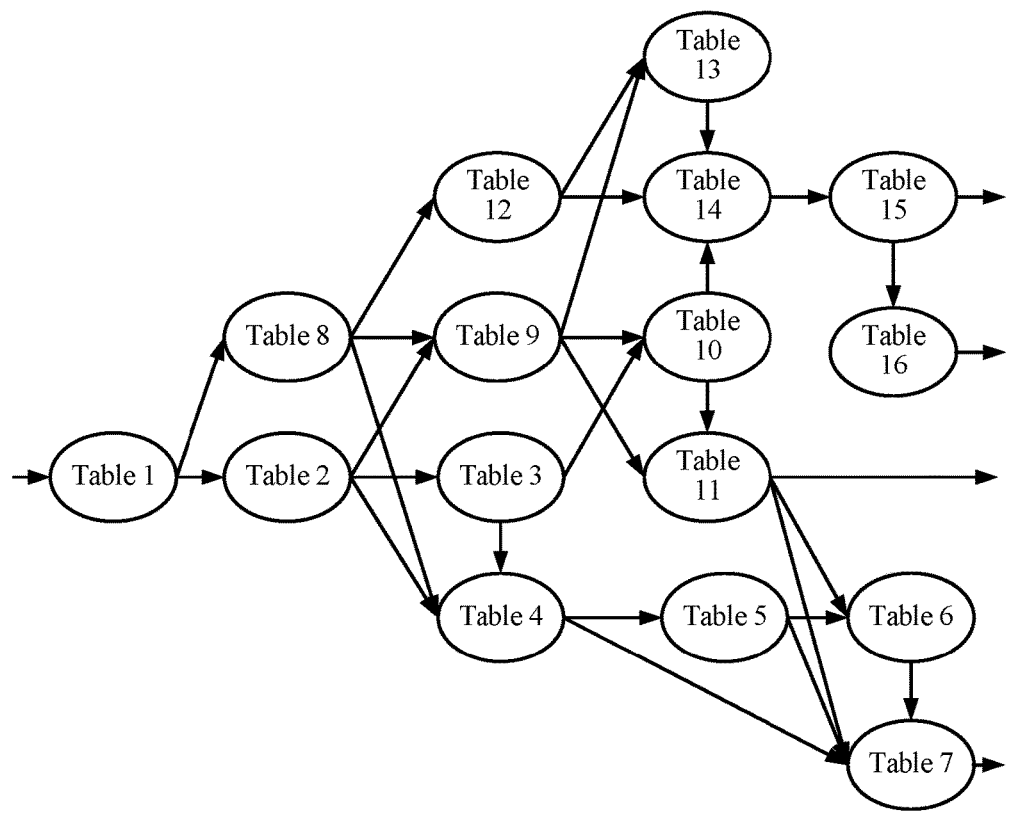
FIG. 6 is a diagram of multiple directed branches formed by forwarding services according to another embodiment.

For example, in this embodiment, an example in which M=38 and N=16 is used for description. Tables that need to be searched to execute each forwarding service are shown in FIG. 6, and FIG. 6 is a diagram of multiple directed branches formed by tables that need to be searched to execute M=38 forwarding services and includes 16 tables that are indicated by using a table 1 to a table 16.

Figure 7:
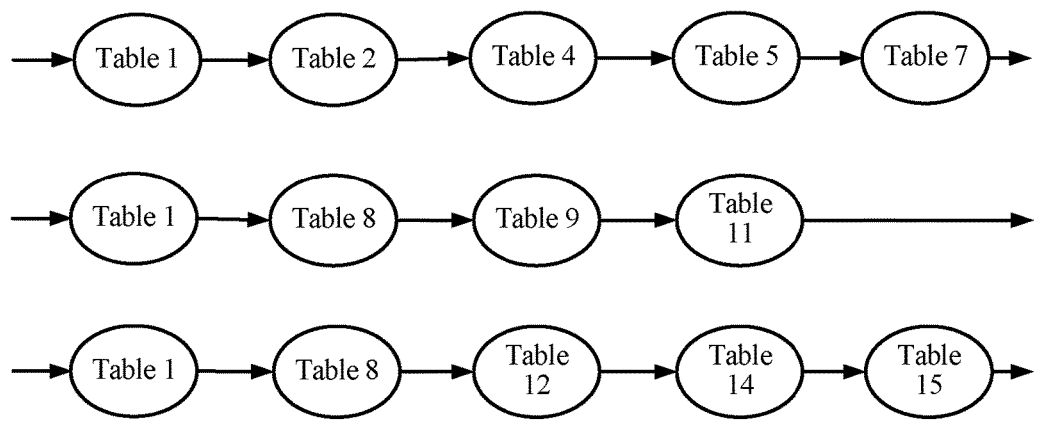
FIG. 7 shows three forwarding services that are shown in FIG. 6 and whose preset performance is a line rate.
Figures 8, 9:
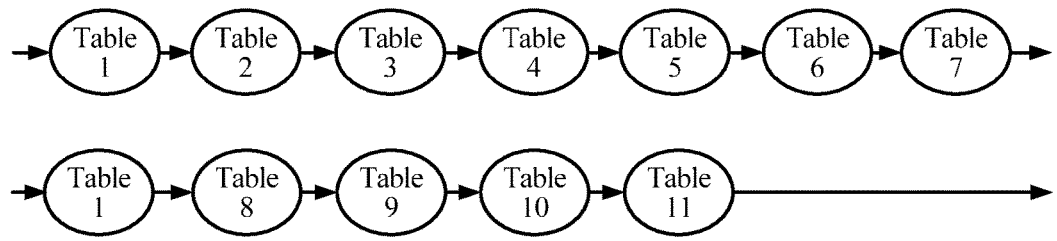
FIG. 8 shows two forwarding services that are shown in FIG. 6 and whose preset performance is a half rate.
FIG. 9 shows a matrix of line-rate simultaneous access information of 16 tables shown in FIG. 6.

In addition, it is assumed that a set including preset performance of the M=38 forwarding services includes Q=3 elements, and $C_1=1$, $C_2=0.5$, and $C_3=0$, where a 1×line rate is a line rate, a 0.5×line rate is also referred to as a half rate, and a 0×line rate is also referred to as a slow rate. That is, preset performance of each forwarding service in the M=38 forwarding services is the line rate, the half rate, or the slow rate. FIG. 7 shows three forwarding services that are in the 38 forwarding services and whose preset performance is the line rate. FIG. 8 shows two forwarding services that are in the 38 forwarding services and whose preset performance is the half rate. Correspondingly, among the 38 forwarding services shown in FIG. 6, except the three forwarding services shown in FIG. 7 and the two forwarding services shown in FIG. 8, preset performance of all the remaining 33 forwarding services is the slow rate, and the remaining 33 forwarding services are not listed herein.

It should be noted that description information of a forwarding service in this embodiment may be defined and stored in the controller 510 by an operator.

502. The controller 510 sends the M pieces of description information to a forwarding device 520.

In this embodiment, for step 502, reference may be made to step 202 shown in FIG. 2, and to avoid repetition, details are not described herein again.

Specifically, the controller 510 may send a control message to the forwarding device by using a control channel, where the control message includes the M pieces of description information.

503. The forwarding device 520 receives the M pieces of description information sent by the controller 510, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$.

In this embodiment, for step 503, reference may be made to step 101 shown in FIG. 1, and to avoid repetition, details are not described herein again.

504. The forwarding device 520 generates Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r \times$ line rate.

In this embodiment, for step 504, reference may be made to step 102 shown in FIG. 1, and to avoid repetition, details are not described herein again.

For example, for the forwarding services shown in FIG. 6, Q pieces of simultaneous access information may be generated according to the three forwarding services whose preset performance is the line rate and that are shown in FIG. 7, the two forwarding services whose preset performance is the half rate and that are shown in FIG. 8, and the 33 forwarding services whose preset performance is the slow rate, and the Q pieces of simultaneous access information include three 16×16 matrices.

A first 16×16 matrix is used to indicate line-rate simultaneous access information of the 16 tables. As shown in FIG. 9, an element in an $i^{th}$ row and a $j^{th}$ column of the first 16×16 matrix indicates whether both an $i^{th}$ table and a $j^{th}$ table in the 16 tables need to be accessed by one forwarding service whose preset performance is the line rate and that is shown in FIG. 7.

For example, a fourth row of the matrix shown in FIG. 9 indicates line-rate simultaneous access information of a table 4 and another table, where an element in the fourth row and a fifth column is 1, indicating that both the table 4 and a table 5 need to be accessed by a same forwarding service whose preset performance is the line rate, for example, a first forwarding service shown in FIG. 7; and an element in the fourth row and an eighth column is 0, indicating that not both the table 4 and a table 8 need to be accessed by any forwarding service whose preset performance is the line rate, which is as follows: none of the forwarding services shown in FIG. 7 includes both the table 4 and the table 8.

A second 16×16 matrix is used to indicate half-rate simultaneous access information of the 16 tables. As shown in FIG. 10, an element in an $i^{th}$ row and a $j^{th}$ column of the second 16×16 matrix indicates whether both an $i^{th}$ table and a $j^{th}$ table in the 16 tables need to be accessed by one forwarding service whose preset performance is the half rate and that is shown in FIG. 8.

For example, a fourth row of the matrix shown in FIG. 10 indicates half-rate simultaneous access information of a table 4 and another table, where an element in the fourth row and a fifth column is 1, indicating that both the table 4 and a table 5 need to be accessed by a same forwarding service whose preset performance is the half rate, for example, a first forwarding service shown in FIG. 8; and an element in the fourth row and an eighth column is 0, indicating that not both the table 4 and a table 8 need to be accessed by any forwarding service whose preset performance is the half rate, which is as follows: neither of the forwarding services shown in FIG. 8 includes both the table 4 and the table 8.

A third 16×16 matrix is used to indicate slow-rate simultaneous access information of the 16 tables, where an element in an $i^{th}$ row and a $j^{th}$ column of the third 16×16 matrix indicates whether both an $i^{th}$ table and a $j^{th}$ table in the 16 tables need to be accessed by one forwarding service whose preset performance is the slow rate. Matrix forms of the slow-rate simultaneous access information are not listed herein.

505. The forwarding device 520 determines, according to the Q pieces of simultaneous access information, that the N tables are to be stored in at least one memory of the forwarding device 520.

In this embodiment, for step 505, reference may be made to step 103 shown in FIG. 1, and to avoid repetition, details are not described herein again.

Specifically, the forwarding device 520 determines that each table in the N tables is to be stored in the at least one memory of the forwarding device.

Optionally, it is assumed that the at least one memory of the forwarding device 520 includes a first memory. Determining that an $m^{th}$ table in the N tables is to be stored in the first memory in the at least one memory includes that: the forwarding device 520 first determines whether each table in the N tables has been stored in the first memory, which is represented as a 1×N matrix, where the 1×N matrix is also referred to as a first table storage bitmap of the first memory. If an element in an $i^{th}$ column of the 1×N matrix is 1, it indicates that an $i^{th}$ table in the N tables has been stored in the first memory, or if an element in an $i^{th}$ column of the 1×N matrix is 0, it indicates that an $i^{th}$ table in the N tables has not been stored in the first memory of the forwarding device.

For the forwarding services shown in FIG. 6, FIG. 11 shows information about a table that has been stored in the first memory of the forwarding device, which is represented as a 1×16 matrix, where elements in a first column and a fifth column of the 1×16 matrix are 1, indicating that the first memory has stored a table 1 and a table 5.

For example, it is assumed that a table to be stored currently is the table 4; that is, when a storage location of the table 4 is to be determined, AND operations are performed on corresponding elements in the fourth row shown in FIG. 9 and corresponding elements in the 1×16 matrix shown in FIG. 11, and a quantity of results that are 1 is $P_1=2$; AND operations are performed on corresponding elements in the fourth row shown in FIG. 10 and corresponding elements in the 1×16 matrix shown in FIG. 11, and a quantity of results that are 1 is $P_2=2$. Because $C_3=0$, a value of $P_3$ corresponding to a forwarding service whose preset performance is the slow rate is not determined herein. It is assumed that bandwidth occupied by a forwarding service whose preset performance is the line rate is: $A=1/4B$, where B is maximum bandwidth that can be provided by the first memory. Because $\max((P_1+1) \times A, (P_2+1) \times 0.5 \times A)=1/2B$, which satisfies $\max((P_1+1) \times A, (P_2+1) \times 0.5 \times A, (P_3+1) \times 0 \times A) \leq B$, the table 4 can be stored in the first memory, that is, it is determined that the storage location in which the table 4 is to be stored is the first memory. Further, the forwarding device 520 stores the table 4 in the first memory and updates a fourth column in information about the table that has been stored in the first memory to 1. That is, the first table storage bitmap of the first memory is updated to a second table storage bitmap, as shown in FIG. 12, of the first memory.

Afterward, the forwarding device 520 may determine, based on the second table storage bitmap shown in FIG. 12, a storage location of a table other than the table 4. A specific determining method is similar to the method for determining the storage location of the table 4, and to avoid repetition, details are not described herein again.

It should be noted that, when the forwarding device 520 still cannot determine, after traversing all memories in the at least one memory, a location in which an $a^{th}$ table is to be stored, the forwarding device 520 generates a first message and sends the first message to the controller 510, where the first message is used to announce that the forwarding device 520 determines that the $a^{th}$ table cannot be stored in the at least one memory, and a is a natural number less than or equal to N.

Optionally, in an embodiment, if the controller 510 does not allow a forwarding service related to the $a^{th}$ table to lower a rate, the controller 510 does not perform further processing after receiving the first message.

Optionally, in another embodiment, if the controller 510 allows a forwarding service related to the $a^{th}$ table to lower a rate, the controller 510 may generate a second message, where the second message is used to instruct the forwarding device 520 to make the best effort to store the $a^{th}$ table. Further, the controller 510 may send the second message to the forwarding device 520, so that the forwarding device 520 operates in a best-effort mode and determines that the $a^{th}$ table is to be stored in a second memory in the at least one memory. In addition, the controller 510 may receive a third message sent by the forwarding device 520, where the third message is used to announce actual performance of a forwarding service supported by the $a^{th}$ table when the forwarding device 520 determines that the $a^{th}$ table is to be stored in the second memory.

506. The forwarding device 520 stores the N tables in the at least one memory of the forwarding device 520.

According to this embodiment, simultaneous access information of a table that needs to be searched to execute a forwarding service is generated according to description information of the forwarding service, where the description information includes preset performance of the forwarding service; and it is determined, according to the simultaneous access information of the table, that the table that needs to be searched to execute the forwarding service is to be stored in at least one memory of a forwarding device. A location in the forwarding device in which the table is to be stored is determined by using the foregoing technical solution, which helps to make actual performance of the forwarding service close to the preset performance as much as possible.

Figure 13:
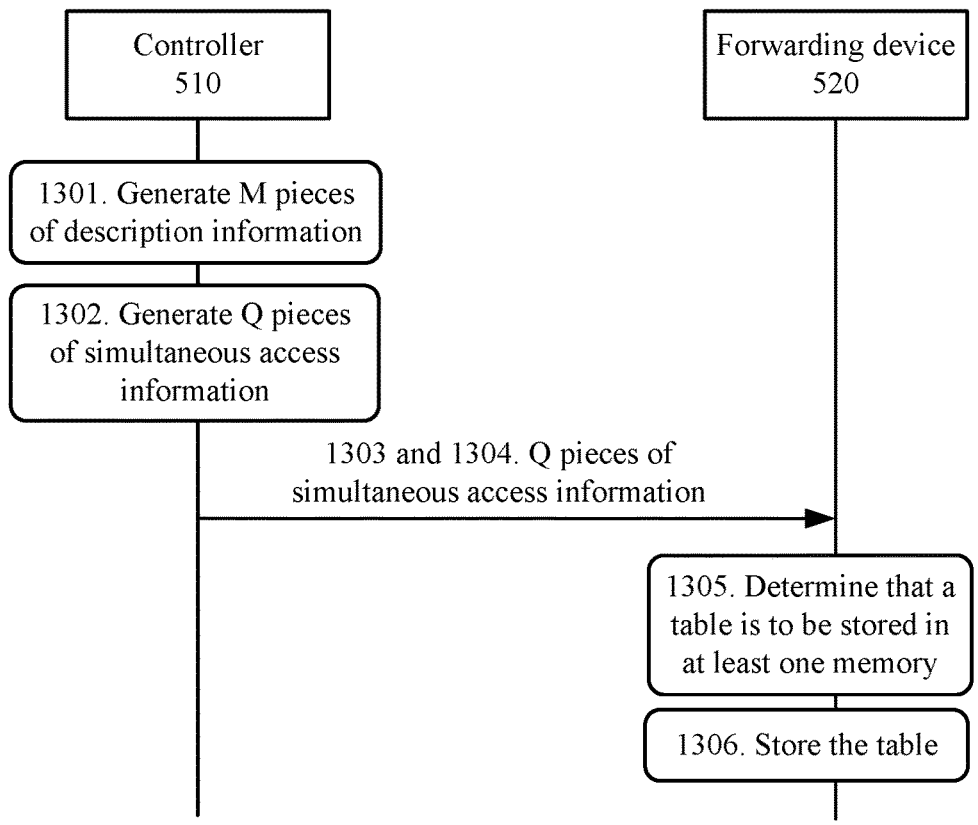
FIG. 13 is a flowchart of a method for determining a storage location of a table according to another embodiment.

FIG. 13 is a flowchart of a method for determining a storage location of a table according to another embodiment. The embodiment corresponding to FIG. 13 may be used to execute the method shown in FIG. 3, and the embodiment corresponding to FIG. 13 may also be used to execute the method shown in FIG. 4. For technical terms involved in the embodiment corresponding to FIG. 13, reference may be made to the embodiment corresponding to FIG. 1. Referring to FIG. 13, the method shown in FIG. 13 includes the following steps:

1301. A controller 510 generates M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$.

In this embodiment, for step 1301, reference may be made to step 201 shown in FIG. 2 or step 401 shown in FIG. 4 or step 501 shown in FIG. 5, and to avoid repetition, details are not described herein again.

1302. The controller 510 generates Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r \times$line rate.

In this embodiment, for step 1302, reference may be made to step 402 shown in FIG. 4, and to avoid repetition, details are not described herein again.

1303. The controller 510 sends the Q pieces of simultaneous access information to a forwarding device 520.

In this embodiment, for step 1303, reference may be made to step 403 shown in FIG. 4, and to avoid repetition, details are not described herein again.

1304. The forwarding device 520 receives the Q pieces of simultaneous access information sent by the controller 510, where the $r^{th}$ piece of simultaneous access information in the Q pieces of simultaneous access information indicates whether every two tables in the N tables need to be accessed by a same forwarding service whose preset performance is the $C_r \times$line rate, and the N tables need to be searched to execute the M forwarding services.

In this embodiment, for step 1304, reference may be made to step 301 shown in FIG. 3, and to avoid repetition, details are not described herein again.

1305. The forwarding device 520 determines, according to the Q pieces of simultaneous access information, that the N tables are to be stored in at least one memory of the forwarding device 520.

In this embodiment, for step 1305, reference may be made to step 103 shown in FIG. 1 or step 302 shown in FIG. 3 or step 505 shown in FIG. 5, and to avoid repetition, details are not described herein again.

1306. The forwarding device 520 stores the N tables in the at least one memory.

In this way, in this embodiment, a controller may determine, according to description information of a forwarding service, simultaneous access information of a table that needs to be searched to execute the forwarding service; further, the controller may send the simultaneous access information of the table to a forwarding device; and the forwarding device determines, according to the simultaneous access information of the table, that the table is to be stored in at least one memory of the forwarding device. Determining, in this way, a location in the forwarding device in which the table is to be stored helps to make actual performance of the forwarding service close to preset performance as much as possible.

Figure 14:
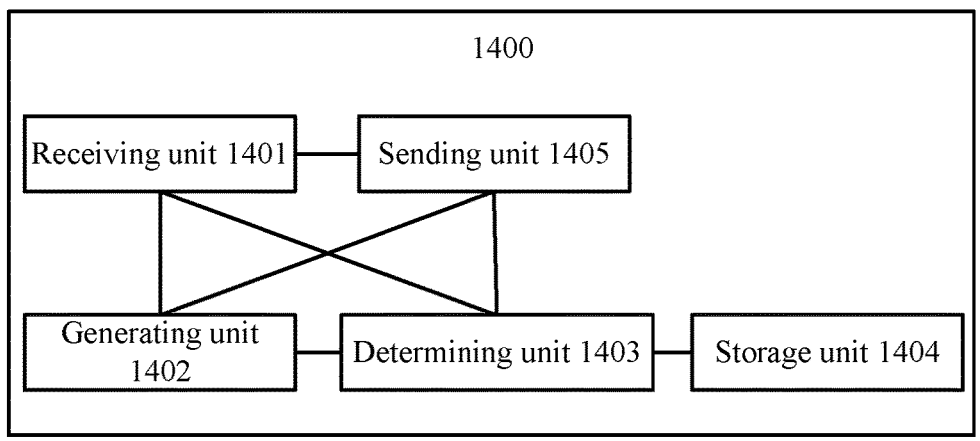
FIG. 14 is a block diagram of a forwarding device according to an embodiment.

FIG. 14 is a block diagram of a forwarding device according to an embodiment. The forwarding device may be configured to execute the method shown in FIG. 1. A forwarding device 1400 shown in FIG. 14 includes: a receiving unit 1401, a generating unit 1402, a determining unit 1403, and a storage unit 1404.

The receiving unit 1401 is configured to receive M pieces of description information sent by a controller, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$.

The generating unit 1402 is configured to generate Q pieces of simultaneous access information according to the M pieces of description information received by the receiving unit 1401, where an $r^{th}$ piece of simultaneous access information in the Q pieces of simultaneous access information indicates whether every two tables in the N tables need to be accessed by a same forwarding service whose preset performance is the $C_r\times$line rate.

The determining unit 1403 is configured to determine, according to the Q pieces of simultaneous access information generated by the generating unit 1402, that the N tables are to be stored in at least one memory of the forwarding device.

The storage unit 1404 is configured to store the N tables in the at least one memory determined by the determining unit 1403.

According to this embodiment, simultaneous access information of a table that needs to be searched to execute a forwarding service is generated according to description information of the forwarding service, where the description information includes preset performance of the forwarding service; and it is determined, according to the simultaneous access information of the table, that the table that needs to be searched to execute the forwarding service is to be stored in at least one memory of a forwarding device. A location in the forwarding device in which the table is to be stored is determined by using the foregoing technical solution, which helps to make actual performance of the forwarding service close to the preset performance as much as possible.

Optionally, in an embodiment, the Q pieces of simultaneous access information are Q N×N matrices, and an element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r\times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r\times$line rate; where i and j are positive integers, and both i and j are less than or equal to N.

Optionally, in an embodiment, the determining unit 1403 is configured to determine that each table in the N tables is to be stored in the at least one memory of the forwarding device. The determining unit 1403 includes a determining subunit that is configured to determine that an $m^{th}$ table in the N tables is to be stored in the at least one memory of the forwarding device, where the determining subunit includes: a first determining subunit, a second determining subunit, and a third determining subunit.

The first determining subunit is configured to determine whether each table in the N tables has been stored in a first memory in the at least one memory, where a 1×N matrix is used to indicate whether each table in the N tables has been stored in the first memory of the forwarding device, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory.

The second determining subunit is configured to: perform an AND operation on an element in an $m^{th}$ row of each N×N matrix in the Q N×N matrices generated by the generating unit 1402 and a corresponding element in the 1×N matrix determined by the first determining subunit, and determine a quantity of results that are 1, where a quantity of is in results of AND operations performed between elements in the $m^{th}$ row of the $r^{th}$ N×N matrix in the Q N×N matrices and corresponding elements in the 1×N matrix determined by the first determining subunit is $P_r$.

The third determining subunit is configured to determine, based on $\max((P_1+1)\times C_1\times A, \ldots, (P_Q+1)\times C_Q A)\leq B$, that the $m^{th}$ table in the N tables is to be stored in the first memory; where m is a positive integer less than or equal to N; $P_r$ is a nonnegative integer, and $P_r<N$; and A and B are positive numbers, where A indicates bandwidth that needs to be occupied by a forwarding service whose actual performance is a line rate, and B indicates maximum bandwidth that can be provided by the first memory.

Optionally, in another embodiment, the forwarding device 1400 further includes a sending unit 1405; the generating unit 1402 is further configured to generate a first message when the determining unit 1403 determines that an $a^{th}$ table in the N tables cannot be stored in the at least one memory, where the first message is used to announce that the determining unit 1403 determines that the $a^{th}$ table in the N tables cannot be stored in the at least one memory; and the sending unit 1405 is configured to send, to the controller, the first message generated by the generating unit 1402; where a is a positive integer, and a is less than or equal to N.

Optionally, in another embodiment, the receiving unit 1401 is further configured to receive a second message sent by the controller, where the second message is used to instruct the forwarding device to make the best effort to store the $a^{th}$ table in the N tables; the determining unit 1403 is configured to: operate in a best-effort mode according to the second message received by the receiving unit 1401, and determine that the $a^{th}$ table in the N tables is to be stored in a second memory in the at least one memory; the generating unit 1402 is further configured to generate a third message, where the third message is used to announce actual performance of a forwarding service supported by the $a^{th}$ table in the N tables when the determining unit 1403 determines that the $a^{th}$ table in the N tables is to be stored in the second memory; and the sending unit 1405 is further configured to send, to the controller, the third message generated by the generating unit 1402.

The forwarding device 1400 can implement each process implemented by the forwarding device in the embodiments shown in FIG. 1 and FIG. 1, and to avoid repetition, details are not described herein again.

Figure 15:
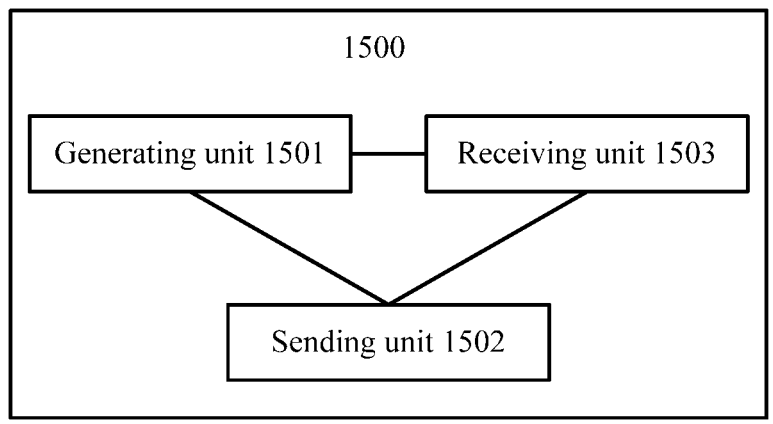
FIG. 15 is a block diagram of a controller according to an embodiment.

FIG. 15 is a block diagram of a controller according to an embodiment. The controller may be configured to execute the method shown in FIG. 2. A controller 1500 shown in FIG. 15 includes: a generating unit 1501 and a sending unit 1502.

The generating unit 1501 is configured to generate M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$.

The sending unit 1502 is configured to send, to a forwarding device, the M pieces of description information generated by the generating unit 1501.

According to this embodiment, simultaneous access information of a table that needs to be searched to execute a forwarding service is generated according to description information of the forwarding service, where the description information includes preset performance of the forwarding service; and it is determined, according to the simultaneous access information of the table, that the table that needs to be searched to execute the forwarding service is to be stored in at least one memory of a forwarding device. A location in the forwarding device in which the table is to be stored is determined by using the foregoing technical solution, which helps to make actual performance of the forwarding service close to the preset performance as much as possible.

Optionally, in an embodiment, the M pieces of description information are used to enable the forwarding device to determine that the N tables are to be stored in at least one memory of the forwarding device, and the controller 1500 further includes a receiving unit 1503. The receiving unit 1503 is configured to receive a first message sent by the forwarding device, where the first message is used to announce that the forwarding device determines that a $j^{th}$ table in the N tables cannot be stored in the at least one memory of the forwarding device; and j is a positive integer, and j is less than or equal to N.

Optionally, in another embodiment, the generating unit 1501 is further configured to generate a second message, where the second message is used to instruct the forwarding device to make the best effort to store the $j^{th}$ table in the N tables; the sending unit 1502 is further configured to send, to the forwarding device, the second message generated by the generating unit 1501, so that the forwarding device operates in a best-effort mode and determines that the $j^{th}$ table in the N tables is to be stored in a second memory in the at least one memory; and the receiving unit 1503 is further configured to receive a third message sent by the forwarding device, where the third message is used to announce actual performance of a forwarding service supported by the $j^{th}$ table in the N tables when the forwarding device determines that the $j^{th}$ table in the N tables is to be stored in the second memory.

The controller 1500 can implement each process implemented by the controller in the embodiments shown in FIG. 2 and FIG. 5.

Figure 16:
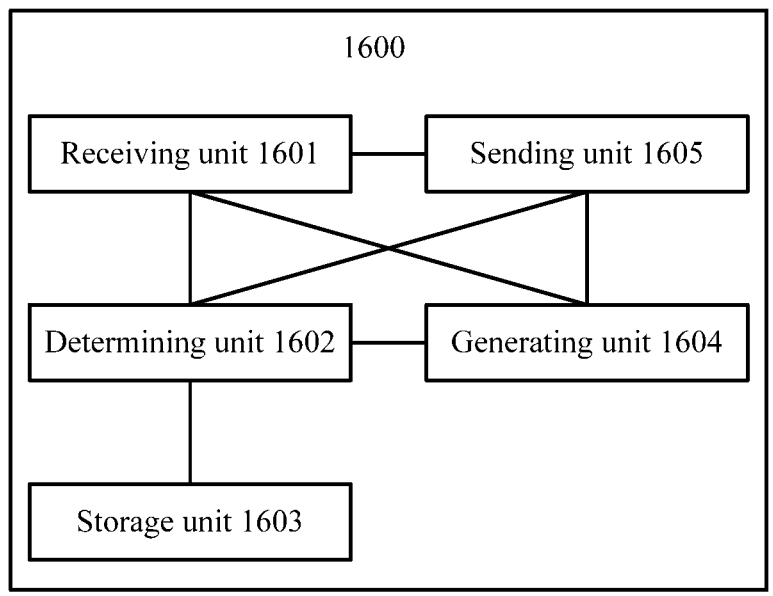
FIG. 16 is a block diagram of a forwarding device according to another embodiment.

FIG. 16 is a block diagram of a forwarding device according to another embodiment. The forwarding device may be configured to execute the method shown in FIG. 3. A forwarding device 1600 shown in FIG. 16 includes: a receiving unit 1601, a determining unit 1602, and a storage unit 1603.

The receiving unit 1601 is configured to receive Q pieces of simultaneous access information sent by a controller, where an $r^{th}$ piece of simultaneous access information in the Q pieces of simultaneous access information indicates whether every two tables in N tables need to be accessed by a same forwarding service whose preset performance is a $C_r \times$line rate, and the N tables need to be searched to execute M forwarding services.

The determining unit 1602 is configured to determine, according to the Q pieces of simultaneous access information generated by the generating unit 1601, that the N tables are to be stored in at least one memory of the forwarding device.

The storage unit 1603 is configured to store the N tables in the at least one memory determined by the determining unit 1602.

According to this embodiment, a forwarding device determines, according to simultaneous access information of a table, that the table is to be stored in at least one memory of the forwarding device, where the simultaneous access information of the table is determined by a controller according to description information of a forwarding service; and the simultaneous access information of the table is further sent to the forwarding device. Determining, in this way, a location in the forwarding device in which the table is to be stored helps to make actual performance of the forwarding service close to preset performance as much as possible.

Optionally, in an embodiment, the Q pieces of simultaneous access information are Q N×N matrices, and an element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$line rate; where i and j are positive integers, and both i and j are less than or equal to N.

Optionally, in an embodiment, the determining unit 1602 is configured to determine that each table in the N tables is to be stored in the at least one memory of the forwarding device. The determining unit 1602 includes a determining subunit that is configured to determine that an $m^{th}$ table in the N tables is to be stored in the at least one memory of the forwarding device, where the determining subunit includes: a first determining subunit, a second determining subunit, and a third determining subunit.

The first determining subunit is configured to determine whether each table in the N tables has been stored in a first memory in the at least one memory, where a 1×N matrix is used to indicate whether each table in the N tables has been stored in the first memory of the forwarding device, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory.

The second determining subunit is configured to: perform an AND operation on an element in an $m^{th}$ row of each N×N matrix in the Q N×N matrices and a corresponding element in the 1×N matrix determined by the first determining subunit, and determine a quantity of results that are 1, where a quantity of 1s in results of AND operations performed between elements in the $m^{th}$ row of the $r^{th}$ N×N matrix in the Q N×N matrices and corresponding elements in the 1×N matrix determined by the first determining subunit is $P_r$.

The third determining subunit is configured to determine, based on $\max((P_1+1)\times C_1\times A, \ldots, (P_Q+1)\times C_Q\times A)\leq B$, that the $m^{th}$ table in the N tables is to be stored in the first memory; where m is a positive integer less than or equal to N; $P_r$ is a nonnegative integer, and $P_r<N$; and A and B are positive numbers, where A indicates bandwidth that needs to be occupied by a forwarding service whose actual performance is a line rate, and B indicates maximum bandwidth that can be provided by the first memory.

Optionally, in another embodiment, the forwarding device 1600 further includes a generating unit 1604 and a sending unit 1605.

The generating unit 1604 is configured to generate a first message when the determining unit 1602 determines that an $a^{th}$ table in the N tables cannot be stored in the at least one memory, where the first message is used to announce that the forwarding device determines that the $a^{th}$ table in the N tables cannot be stored in the at least one memory.

The sending unit 1605 is configured to send, to the controller, the first message generated by the generating unit 1604, where a is a positive integer, and a is less than or equal to N.

Optionally, in another embodiment, the receiving unit 1601 is further configured to receive a second message sent by the controller, where the second message is used to instruct the forwarding device to make the best effort to store the $a^{th}$ table in the N tables; the determining unit 1602 is further configured to: operate in a best-effort mode according to the second message received by the receiving unit 1601, and determine that the $a^{th}$ table in the N tables is to be stored in a second memory in the at least one memory; the generating unit 1604 is further configured to generate a third message, where the third message is used to announce actual performance of a forwarding service supported by the $a^{th}$ table in the N tables when the forwarding device determines that the $a^{th}$ table in the N tables is to be stored in the second memory; and the sending unit 1605 is further configured to send, to the controller, the third message generated by the generating unit 1604.

The forwarding device 1600 can implement each process implemented by the forwarding device in the embodiments shown in FIG. 3 and FIG. 13, and to avoid repetition, details are not described herein again.

Figure 17:
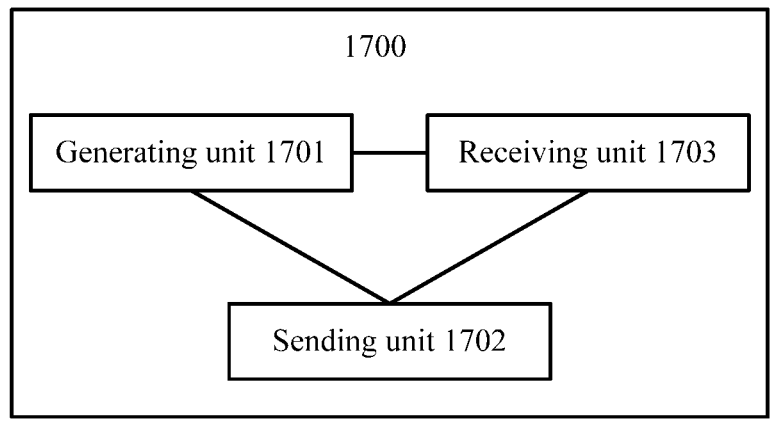
FIG. 17 it is a block diagram of a controller according to another embodiment.

FIG. 17 is a block diagram of a controller according to another embodiment. The controller may be configured to execute the method shown in FIG. 4. A controller 1700 shown in FIG. 17 includes: a generating unit 1701 and a sending unit 1702.

The generating unit 1701 is configured to generate M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r\times$line rate, M, N, Q, and r are positive integers, $2\leq N$, $Q\leq M$, $r\leq Q$, and $0\leq C_r\leq 1$.

The generating unit 1701 is further configured to generate Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r\times$line rate.

The sending unit 1702 is configured to send, to a forwarding device, the Q pieces of simultaneous access information generated by the generating unit.

According to this embodiment, a controller determines, according to description information of a forwarding service, simultaneous access information of a table that needs to be searched to execute the forwarding service, and further sends the simultaneous access information of the table to a forwarding device, so that the forwarding device can determine, according to the simultaneous access information of the table, that the table is to be stored in at least one memory of the forwarding device. Determining, in this way, a location in the forwarding device in which the table is to be stored helps to make actual performance of the forwarding service close to preset performance as much as possible.

Optionally, in an embodiment, the Q pieces of simultaneous access information are Q N×N matrices, and an element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r\times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r\times$line rate; where i and j are positive integers, and both i and j are less than or equal to N.

Optionally, in an embodiment, the M pieces of description information are used to enable the forwarding device to determine that the N tables are to be stored in at least one memory of the forwarding device; and the controller 1700 further includes: a receiving unit 1703, configured to receive a first message sent by the forwarding device, where the first message is used to announce that the forwarding device determines that an $a^{th}$ table in the N tables cannot be stored in the at least one memory of the forwarding device; and a is a positive integer, and a is less than or equal to N.

Optionally, in another embodiment, the generating unit 1701 is further configured to generate a second message, where the second message is used to instruct the forwarding device to make the best effort to store the $a^{th}$ table in the N tables.

The sending unit 1702 is further configured to send, to the forwarding device, the second message generated by the generating unit 1701, so that the forwarding device operates in a best-effort mode and determines that the $a^{th}$ table in the N tables is to be stored in a second memory in the at least one memory.

The receiving unit 1703 is further configured to receive a third message sent by the forwarding device, where the third message is used to announce actual performance of a forwarding service supported by the $a^{th}$ table in the N tables when the forwarding device determines that the $a^{th}$ table in the N tables is to be stored in the second memory.

The controller 1700 can implement each process implemented by the controller in the embodiments shown in FIG. 4 and FIG. 13.

Figure 18:
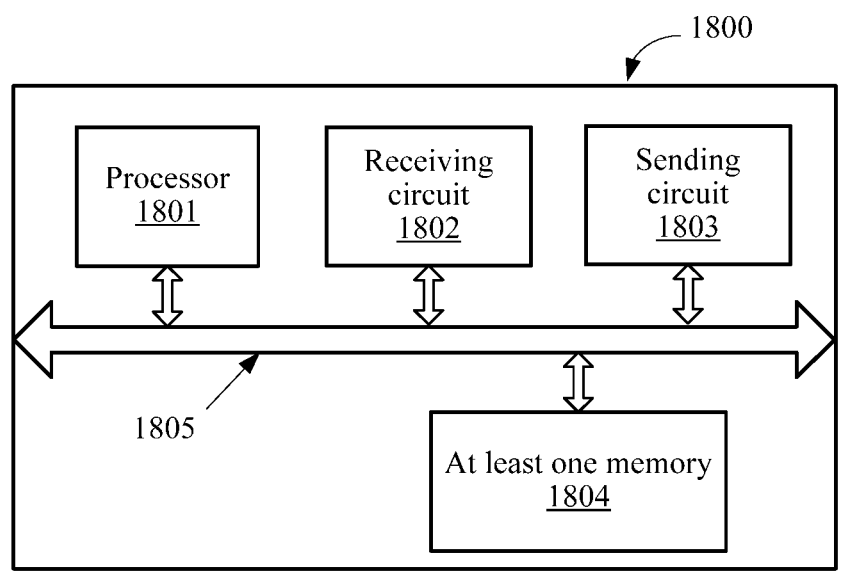
FIG. 18 is a block diagram of a forwarding device according to another embodiment.

FIG. 18 is a block diagram of a forwarding device according to another embodiment. The forwarding device may be configured to execute the method shown in FIG. 1. In addition, the forwarding device shown in FIG. 18 may be configured to implement the forwarding device shown in FIG. 14. A forwarding device 1800 shown in FIG. 18 includes: a processor 1801, a receiving circuit 1802, a sending circuit 1803, and at least one memory 1804.

The receiving circuit 1802 is configured to receive M pieces of description information sent by a controller, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r\times$line rate, M, N, Q, and r are positive integers, 2≤N, Q≤M, r≤Q, and 0≤$C_r$≤1.

The processor 1801 is configured to generate Q pieces of simultaneous access information according to the M pieces of description information received by the receiving circuit 1802, where an $r^{th}$ piece of simultaneous access information in the Q pieces of simultaneous access information indicates whether every two tables in the N tables need to be accessed by a same forwarding service whose preset performance is the $C_r\times$line rate. The processor 1801 is further configured to: determine, according to the Q pieces of simultaneous access information, that the N tables are to be stored in the at least one memory 1804 of the forwarding device 1800, and further store the N tables in the at least one memory 1804.

According to this embodiment, simultaneous access information of a table that needs to be searched to execute a forwarding service is generated according to description information of the forwarding service, where the description information includes preset performance of the forwarding service; and it is determined, according to the simultaneous access information of the table, that the table that needs to be searched to execute the forwarding service is to be stored in at least one memory of a forwarding device. A location in the forwarding device in which the table is to be stored is determined by using the foregoing technical solution, which helps to make actual performance of the forwarding service close to the preset performance as much as possible.

All components of the forwarding device 1800 are coupled together by using a bus system 1805. In addition to a data bus, the bus system 1805 further includes a power bus, a control bus, and a status signal bus. However, for clarity of description, various buses are marked as the bus system 1805 shown in the FIG. 18.

Optionally, in an embodiment, the Q pieces of simultaneous access information are Q N×N matrices, and an element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r\times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r\times$line rate; where i and j are positive integers, and both i and j are less than or equal to N.

Optionally, in an embodiment, the processor 1801 is configured to determine that each table in the N tables is to be stored in the at least one memory 1804 of the forwarding device. Determining that an $m^{th}$ table in the N tables is to be stored in the at least one memory 1804 of the forwarding device is configured to: determine whether each table in the N tables has been stored in a first memory in the at least one memory 1804, where a 1×N matrix is used to indicate whether each table in the N tables has been stored in the first memory of the forwarding device, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory; perform an AND operation on an element in an $m^{th}$ row of each N×N matrix in the generated Q N×N matrices and a corresponding element in the determined 1×N matrix, and determine a quantity of results that are 1, where a quantity of is in results of AND operations performed between elements in the $m^{th}$ row of the $r^{th}$ N×N matrix in the Q N×N matrices and corresponding elements in the determined 1×N matrix is $P_r$; and determine, based on $\max((P_1+1)\times C_1\times A, \ldots, (P_Q\times 1)\times C_Q A)\leq B$, that the $m^{th}$ table in the N tables is to be stored in the first memory; where m is a positive integer less than or equal to N; $P_r$ is a nonnegative integer, and $P_r<N$; and A and B are positive numbers, where A indicates bandwidth that needs to be occupied by a forwarding service whose actual performance is a line rate, and B indicates maximum bandwidth that can be provided by the first memory.

Optionally, in another embodiment, the processor 1801 is further configured to generate a first message when it is determined, according to the Q pieces of simultaneous access information, that an $a^{th}$ table in the N tables cannot be stored in the at least one memory 1804, where the first message is used to announce that it is determined that the $a^{th}$ table in the N tables cannot be stored in the at least one memory 1804; and the sending circuit 1803 is configured to send the generated first message to the controller, where a is a positive integer, and a is less than or equal to N.

Optionally, in another embodiment, the receiving circuit 1802 is further configured to receive a second message sent by the controller, where the second message is used to instruct the forwarding device 1800 to make the best effort to store the $a^{th}$ table in the N tables. The processor 1801 is further configured to: operate in a best-effort mode according to the second message received by the receiving circuit 1802, and determine that the $a^{th}$ table in the N tables is to be stored in a second memory in the at least one memory 1804; and generate a third message, where the third message is used to announce actual performance of a forwarding service supported by the $a^{th}$ table in the N tables when the forwarding device 1800 determines that the $a^{th}$ table in the N tables is to be stored in the second memory. The sending circuit 1803 is further configured to send the generated third message to the controller.

The methods disclosed in the foregoing embodiments may be applied in the processor 1801 or implemented by the processor 1801, where the processor 1801 may be an integrated circuit chip and has a signal processing capability. In an implementation process, steps in the foregoing methods may be completed by using a hardware integrated logic circuit or instructions in a software form in the processor 1801. The foregoing processor 1801 may be a general purpose processor, a digital signal processor (DSP), an application-specific integrated circuit (ASIC), a field programmable gate array (FPGA) or another programmable logic component, a discrete gate or a transistor logic component, or a discrete hardware assembly, which may implement or execute various methods, steps, and logical block diagrams that are disclosed in the embodiments. The general purpose processor may be a microprocessor, or the processor may be any conventional processor, or the like. The steps of the methods disclosed with reference to the embodiments may be directly executed and completed by a hardware decoding processor, or executed and completed by using a combination of a hardware module and a software module in a decoding processor. The software module may be located in a mature storage medium in the field, such as a random access memory (RAM), a flash memory, a read-only memory (ROM), a programmable read-only memory, an electrically-erasable programmable memory, or a register. The storage medium is located in the at least one memory 1804, and the processor 1801 reads information from the at least one memory 1804 and completes the steps of the foregoing methods in combination with hardware of the processor 1801.

The forwarding device 1800 can implement each process implemented by the forwarding device in the embodiments shown in FIG. 1 and FIG. 1, and to avoid repetition, details are not described herein again.

Figure 19:
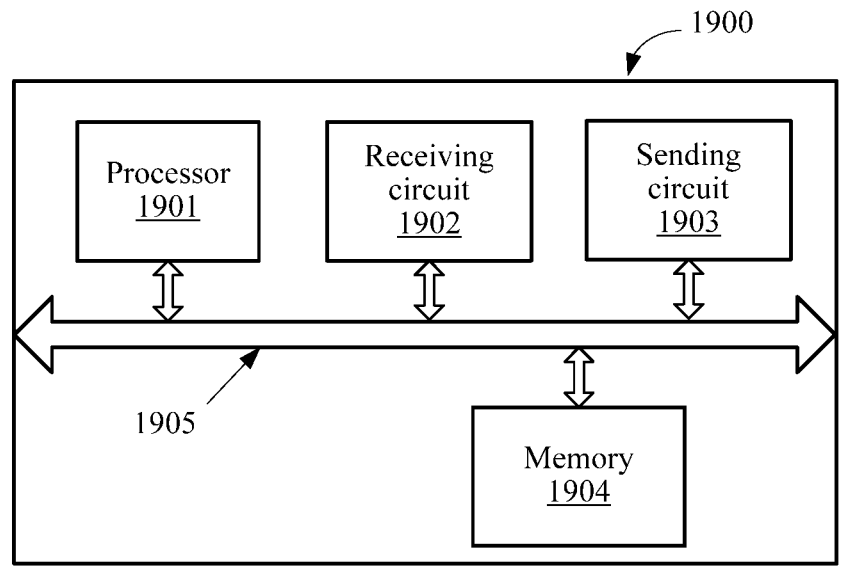
FIG. 19 is a block diagram of a controller according to another embodiment.

FIG. 19 is a block diagram of a controller according to another embodiment. The controller may be configured to execute the method shown in FIG. 2. In addition, the controller shown in FIG. 19 may be configured to implement the controller shown in FIG. 15. A controller 1900 shown in FIG. 19 includes a processor 1901, a receiving circuit 1902, a sending circuit 1903, and a memory 1904.

The processor 1901 is configured to generate M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r$×line rate, M, N, Q, and r are positive integers, 2≤N, Q≤M, r≤Q, and 0≤$C_r$≤1.

The sending circuit 1903 is configured to send, to a forwarding device, the M pieces of description information generated by the processor 1901.

According to this embodiment, simultaneous access information of a table that needs to be searched to execute a forwarding service is generated according to description information of the forwarding service, where the description information includes preset performance of the forwarding service; and it is determined, according to the simultaneous access information of the table, that the table that needs to be searched to execute the forwarding service is to be stored in at least one memory of a forwarding device. A location in the forwarding device in which the table is to be stored is determined by using the foregoing technical solution, which helps to make actual performance of the forwarding service close to the preset performance as much as possible.

All components of the controller 1900 are coupled together by using a bus system 1905. In addition to a data bus, the bus system 1905 further includes a power bus, a control bus, and a status signal bus. However, for clarity of description, various buses are marked as the bus system 1905 shown in the FIG. 19.

Optionally, in an embodiment, the M pieces of description information are used to enable the forwarding device to determine that the N tables are to be stored in at least one memory of the forwarding device. The receiving circuit 1902 is configured to receive a first message sent by the forwarding device, where the first message is used to announce that the forwarding device determines that a $j^{th}$ table in the N tables cannot be stored in the at least one memory of the forwarding device; and j is a positive integer, and j is less than or equal to N.

Optionally, in another embodiment, the processor 1901 is further configured to generate a second message, where the second message is used to instruct the forwarding device to make the best effort to store the $j^{th}$ table in the N tables; the sending circuit 1903 is further configured to send the second message to the forwarding device, so that the forwarding device operates in a best-effort mode and determines that the $j^{th}$ table in the N tables is to be stored in a second memory in the at least one memory; and the receiving circuit 1902 is further configured to receive a third message sent by the forwarding device, where the third message is used to announce actual performance of a forwarding service supported by the $j^{th}$ table in the N tables when the forwarding device determines that the $j^{th}$ table in the N tables is to be stored in the second memory.

The methods disclosed in the foregoing embodiments may be applied in the processor 1901 or implemented by the processor 1901, where the processor 1901 may be an integrated circuit chip and has a signal processing capability. In an implementation process, steps in the foregoing methods may be completed by using a hardware integrated logic circuit or instructions in a software form in the processor 1901. The foregoing processor 1901 may be a general purpose processor, a DSP, an ASIC, an FPGA or another programmable logic component, a discrete gate or a transistor logic component, or a discrete hardware assembly, which may implement or execute various methods, steps, and logical block diagrams that are disclosed in the embodiments. The general purpose processor may be a microprocessor, or the processor may be any conventional processor. The steps of the methods disclosed with reference to the embodiments may be directly executed and completed by a hardware decoding processor, or executed and completed by using a combination of a hardware module and a software module in a decoding processor. The software module may be located in a mature storage medium in the field, such as a RAM, a flash memory, a ROM, a programmable read-only memory, an electrically-erasable programmable memory, or a register. The storage medium is located in the memory 1904, and the processor 1901 reads information from the memory 1904 and completes the steps of the foregoing methods in combination with hardware of the processor 1901.

The controller 1900 can implement each process implemented by the controller in the embodiments shown in FIG. 2 and FIG. 1, and to avoid repetition, details are not described herein again.

Figure 20:
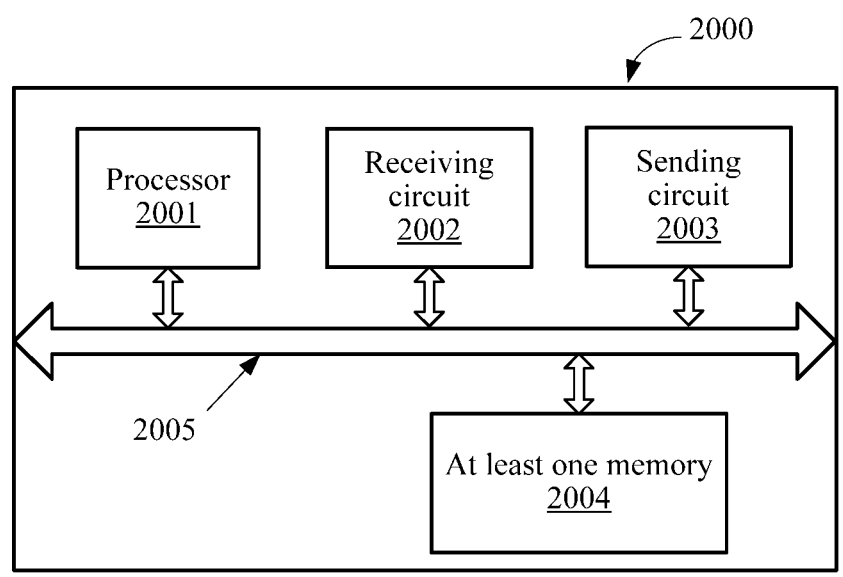
FIG. 20 is a block diagram of a forwarding device according to another embodiment.

FIG. 20 is a block diagram of a forwarding device according to another embodiment. The forwarding device may be configured to execute the method shown in FIG. 3. In addition, the forwarding device shown in FIG. 20 may be configured to implement the forwarding device shown in FIG. 16. A forwarding device 2000 shown in FIG. 20 includes: a processor 2001, a receiving circuit 2002, a sending circuit 2003, and at least one memory 2004.

The receiving circuit 2002 is configured to receive Q pieces of simultaneous access information sent by a controller, where an $r^{th}$ piece of simultaneous access information in the Q pieces of simultaneous access information indicates whether every two tables in N tables need to be accessed by a same forwarding service whose preset performance is a $C_r \times$line rate, and the N tables need to be searched to execute M forwarding services.

The processor 2001 is further configured to: determine, according to the Q pieces of simultaneous access information received by the receiving circuit 2002, that the N tables are to be stored in the at least one memory 2004 of the forwarding device, and further store the N tables in the at least one memory 2004.

According to this embodiment, a forwarding device determines, according to simultaneous access information of a table, that the table is to be stored in at least one memory of the forwarding device, where the simultaneous access information of the table is determined by a controller according to description information of a forwarding service; and the simultaneous access information of the table is further sent to the forwarding device. Determining, in this way, a location in the forwarding device in which the table is to be stored helps to make actual performance of the forwarding service close to preset performance as much as possible.

All components of the forwarding device 2000 are coupled together by using a bus system 2005. In addition to a data bus, the bus system 2005 further includes a power bus, a control bus, and a status signal bus. However, for clarity of description, various buses are marked as the bus system 2005 shown in the FIG. 20.

Optionally, in an embodiment, the Q pieces of simultaneous access information are Q N×N matrices, and an element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$line rate; where i and j are positive integers, and both i and j are less than or equal to N.

Optionally, in an embodiment, the processor 2001 is configured to determine that each table in the N tables is to be stored in the at least one memory 2004 of the forwarding device. Determining that an $m^{th}$ table in the N tables is to be stored in the at least one memory 2004 of the forwarding device is configured to: determine whether each table in the N tables has been stored in a first memory in the at least one memory 2004, where a 1×N matrix is used to indicate whether each table in the N tables has been stored in the first memory of the forwarding device, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory; perform an AND operation on an element in an $m^{th}$ row of each N×N matrix in the Q N×N matrices and a corresponding element in the 1×N matrix, and determine a quantity of results that are 1, where a quantity of is in results of AND operations performed between elements in the $m^{th}$ row of the $r^{th}$ N×N matrix in the Q N×N matrices and corresponding elements in the 1×N matrix is $P_r$; and determine, based on $\max((P_1+1) \times C_1 \times A, \ldots, (P_Q \times 1) \times C_Q \times A) \leq B$, that the $m^{th}$ table in the N tables is to be stored in the first memory; where m is a positive integer less than or equal to N; $P_r$ is a nonnegative integer, and $P_r < N$; and A and B are positive numbers, where A indicates bandwidth that needs to be occupied by a forwarding service whose actual performance is a line rate, and B indicates maximum bandwidth that can be provided by the first memory.

Optionally, in another embodiment, the processor 2001 is further configured to generate a first message when it is determined, according to the Q pieces of simultaneous access information, that an $a^{th}$ table in the N tables cannot be stored in the at least one memory 2004, where the first message is used to announce that the forwarding device determines that the $a^{th}$ table in the N tables cannot be stored in the at least one memory 2004; and the sending circuit 2003 is configured to send the generated first message to the controller, where a is a positive integer, and a is less than or equal to N.

Optionally, in another embodiment, the receiving circuit 2002 is further configured to receive a second message sent by the controller, where the second message is used to instruct the forwarding device to make the best effort to store the $a^{th}$ table in the N tables. The processor 2001 is further configured to: operate in a best-effort mode according to the second message received by the receiving circuit 2002, and determine that the $a^{th}$ table in the N tables is to be stored in a second memory in the at least one memory 2004; and generate a third message, where the third message is used to announce actual performance of a forwarding service supported by the $a^{th}$ table in the N tables when the forwarding device determines that the $a^{th}$ table in the N tables is to be stored in the second memory. The sending circuit 2003 is further configured to send the third message to the controller.

The methods disclosed in the foregoing embodiments may be applied in the processor 2001 or implemented by the processor 2001, where the processor 2001 may be an integrated circuit chip and has a signal processing capability. In an implementation process, steps in the foregoing methods may be completed by using a hardware integrated logic circuit or instructions in a software form in the processor 2001. The foregoing processor 2001 may be a general purpose processor, a DSP, an ASIC, an FPGA or another programmable logic component, a discrete gate or a transistor logic component, or a discrete hardware assembly, which may implement or execute various methods, steps, and logical block diagrams that are disclosed in the embodiments. The general purpose processor may be a microprocessor, or the processor may be any conventional processor. The steps of the methods disclosed with reference to the embodiments may be directly executed and completed by a hardware decoding processor, or executed and completed by using a combination of a hardware module and a software module in a decoding processor. The software module may be located in a mature storage medium in the field, such as a RAM, a flash memory, a ROM, a programmable read-only memory, an electrically-erasable programmable memory, or a register. The storage medium is located in the at least one memory 2004, and the processor 2001 reads information from the at least one memory 2004 and completes the steps of the foregoing methods in combination with hardware of the processor 2001.

The forwarding device 2000 can implement each process implemented by the forwarding device in the embodiments shown in FIG. 3 and FIG. 13, and to avoid repetition, details are not described herein again.

Figure 21:
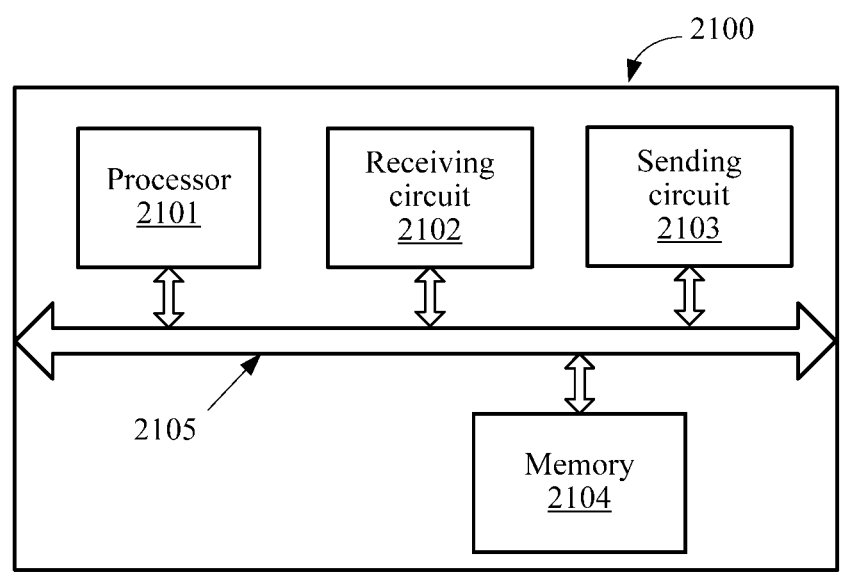
FIG. 21 is a block diagram of a controller according to another embodiment.

FIG. 21 is a block diagram of a controller according to another embodiment. The controller may be configured to execute the method shown in FIG. 4. In addition, the controller shown in FIG. 21 may be configured to implement the controller shown in FIG. 17. A controller 2100 shown in FIG. 21 includes a processor 2101, a receiving circuit 2102, a sending circuit 2103, and a memory 2104.

The processor 2101 is configured to generate M pieces of description information, where the M pieces of description information are in a one-to-one correspondence with M forwarding services, each piece of description information in the M pieces of description information includes preset performance of a corresponding forwarding service and an identifier of a table that needs to be searched to execute the corresponding forwarding service, and N tables need to be searched to execute the M forwarding services; a set including preset performance of the M forwarding services includes Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$. The processor 2101 is further configured to generate Q pieces of simultaneous access information according to the M pieces of description information, where an $r^{th}$ piece of simultaneous access information in the Q pieces of simultaneous access information indicates whether every two tables in the N tables need to be accessed by a same forwarding service whose preset performance is the $C_r \times$line rate.

The sending circuit 2103 is configured to send the Q pieces of generated simultaneous access information to a forwarding device.

According to this embodiment, a controller determines, according to description information of a forwarding service, simultaneous access information of a table that needs to be searched to execute the forwarding service, and further sends the simultaneous access information of the table to a forwarding device, so that the forwarding device can determine, according to the simultaneous access information of the table, that the table is to be stored in at least one memory of the forwarding device. Determining, in this way, a location in the forwarding device in which the table is to be stored helps to make actual performance of the forwarding service close to preset performance as much as possible.

All components of the controller 2100 are coupled together by using a bus system 2105. In addition to a data bus, the bus system 2105 further includes a power bus, a control bus, and a status signal bus. However, for clarity of description, various buses are marked as the bus system 2105 shown in the FIG. 21.

Optionally, in an embodiment, the Q pieces of simultaneous access information are Q N×N matrices, and an element of each N×N matrix in the Q N×N matrices is 1 or 0. If an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables need to be accessed by at least one forwarding service that is in the M forwarding services and whose preset performance is the $C_r \times$line rate; or if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables need to be accessed by any forwarding service that is in the M forwarding services and whose preset performance is the $C_r \times$line rate; where i and j are positive integers, and both i and j are less than or equal to N.

Optionally, in an embodiment, the M pieces of description information are used to enable the forwarding device to determine that the N tables are to be stored in at least one memory of the forwarding device; and the receiving circuit 2102 is configured to receive a first message sent by the forwarding device, where the first message is used to announce that the forwarding device determines that an $a^{th}$ table in the N tables cannot be stored in the at least one memory of the forwarding device; and a is a positive integer, and a is less than or equal to N.

Optionally, in another embodiment, the processor 2101 is further configured to generate a second message, where the second message is used to instruct the forwarding device to make the best effort to store the $a^{th}$ table in the N tables; the sending circuit 2103 is further configured to send the generated second message to the forwarding device, so that the forwarding device operates in a best-effort mode and determines that the $a^{th}$ table in the N tables is to be stored in a second memory in the at least one memory; and the receiving circuit 2102 is further configured to receive a third message sent by the forwarding device, where the third message is used to announce actual performance of a forwarding service supported by the $a^{th}$ table in the N tables when the forwarding device determines that the $a^{th}$ table in the N tables is to be stored in the second memory.

The methods disclosed in the foregoing embodiments may be applied in the processor 2101 or implemented by the processor 2101, where the processor 2101 may be an integrated circuit chip and has a signal processing capability. In an implementation process, steps in the foregoing methods may be completed by using a hardware integrated logic circuit or instructions in a software form in the processor 2101. The foregoing processor 2101 may be a general purpose processor, a DSP, an ASIC, an FPGA or another programmable logic component, a discrete gate or a transistor logic component, or a discrete hardware assembly, which may implement or execute various methods, steps, and logical block diagrams that are disclosed in the embodiments. The general purpose processor may be a microprocessor, or the processor may be any conventional processor. The steps of the methods disclosed with reference to the embodiments may be directly executed and completed by a hardware decoding processor, or executed and completed by using a combination of a hardware module and a software module in a decoding processor. The software module may be located in a mature storage medium in the field, such as a RAM, a flash memory, a ROM, a programmable read-only memory, an electrically-erasable programmable memory, or a register. The storage medium is located in the memory 2104, and the processor 2101 reads information from the memory 2104 and completes the steps of the foregoing methods in combination with hardware of the processor 2101.

The controller 2100 can implement each process implemented by the controller in the embodiments shown in FIG. 4 and FIG. 13, and to avoid repetition, details are not described herein again.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to execute all or some of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   receiving, by a forwarding device, M pieces of description information sent by a controller, wherein the M pieces of description information are in a one-to-one correspondence with M forwarding services, each piece of description information of the M pieces of description information comprising:
   a preset performance of a corresponding forwarding service; and
   an identifier of a table to be searched to execute the corresponding forwarding service, wherein N tables are to be searched to execute the M forwarding services, wherein a set comprising preset performance of the M forwarding services comprises Q elements, wherein the Q elements are a first element to a $Q^{th}$ element, and each element in the Q elements indicates one type of preset performance, and an rth element in the Q elements indicates that the preset performance is a $C_r \times$line rate, wherein M, N, Q, and r are positive integers, wherein $2 \leq N$, $Q \leq M$, $r \leq Q$, and $0 \leq C_r \leq 1$;
   generating, by the forwarding device, Q pieces of simultaneous access information according to the M pieces of description information, wherein an $r^{th}$ piece of simultaneous access information in the Q pieces of simultaneous access information indicates whether every two tables in the N tables are to be accessed by a same forwarding service whose preset performance is the $C_r \times$line rate;
   determining, by the forwarding device according to the Q pieces of simultaneous access information, a memory location where the N tables are to be stored in at least one memory of the forwarding device; and
   storing, by the forwarding device, the N tables at the memory location in the at least one memory.

2. The method according to claim 1, wherein the Q pieces of simultaneous access information are Q N×N matrices, and an element of each N×N matrix in the Q N×N matrices is 1 or 0.

3. The method according to claim 2, wherein an element in an $i^{th}$ row and a $j^{th}$ column of an $r^{th}$ N×N matrix in the Q N×N matrices being 1 is an indication that both an $i^{th}$ table in the N tables and a $j^{th}$ table in the N tables are to be accessed by at least one forwarding service that is in the M forwarding services and whose preset performance is the $C_r \times$line rate, wherein i and j are positive integers, and both i and j are less than or equal to N.

4. The method according to claim 2, wherein an element in an $i^{th}$ row and a $j^{th}$ column of an $r^{th}$ N×N matrix in the Q N×N matrices being 0 is an indication that not both an $i^{th}$ table in the N tables and a $j^{th}$ table in the N tables are to be accessed by any forwarding service that is in the M forwarding services and whose preset performance is the $C_r \times$line rate, wherein i and j are positive integers, and both i and j are less than or equal to N.

5. The method according to claim 2, wherein the determining, by the forwarding device according to the Q pieces of simultaneous access information, the memory location where the N tables are to be stored in at least one memory of the forwarding device comprises: determining that each table in the N tables is to be stored in the at least one memory of the forwarding device; and wherein determining, by the forwarding device, that an $m^{th}$ table in the N tables is to be stored in the at least one memory of the forwarding device comprises:

determining, by the forwarding device, whether each table in the N tables has been stored in a first memory in the at least one memory, wherein a 1×N matrix is used to indicate whether each table in the N tables has been stored in the first memory, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether an $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory;

performing, by the forwarding device, an AND operation on an element in an $m^{th}$ row of each N×N matrix in the Q N×N matrices and a corresponding element in the 1×N matrix, and determining a quantity of results that are 1, wherein a quantity of 1s in results of AND operations performed between elements in an $m^{th}$ row of an $r^{th}$ N×N matrix in the Q N×N matrices and corresponding elements in the 1×N matrix is $P_r$; and determining, by the forwarding device based on $\max((P_1+1)\times C_1\times A, \ldots, (P_Q+1)\times C_Q\times A)\leq B$, that the $m^{th}$ table in the N tables is to be stored in the first memory; wherein m is a positive integer less than or equal to N; $P_r$ is a nonnegative integer, and $P_r<N$; and A and B are positive numbers, wherein A indicates bandwidth to be occupied by a forwarding service whose actual performance is a line rate, and B indicates maximum bandwidth that can be provided by the first memory.

6. The method according to claim 1, further comprising:
generating, by the forwarding device, a first message when the forwarding device determines, according to the Q pieces of simultaneous access information, that an $a^{th}$ table in the N tables cannot be stored in the at least one memory, wherein the first message is used to announce that the forwarding device determines that the $a^{th}$ table in the N tables cannot be stored in the at least one memory; and sending, by the forwarding device, the first message to the controller, wherein a is a positive integer, and a is less than or equal to N.

7. The method according to claim 6, further comprising:
receiving, by the forwarding device, a second message sent by the controller, wherein the second message is used to instruct the forwarding device to store the $a^{th}$ table in the N tables;

operating, by the forwarding device, in a best-effort mode according to the second message, and determining that the $a^{th}$ table in the N tables is to be stored in a second memory in the at least one memory;

generating, by the forwarding device, a third message, wherein the third message is used to announce actual performance of a forwarding service supported by the $a^{th}$ table in the N tables when the forwarding device determines that the $a^{th}$ table in the N tables is to be stored in the second memory; and sending, by the forwarding device, the third message to the controller.

8. A method, comprising:
generating, by a controller, M pieces of description information, wherein the M pieces of description information are in a one-to-one correspondence with M forwarding services, each piece of description information in the M pieces of description information comprising a preset performance of a corresponding forwarding service and an identifier of a table to be searched to execute the corresponding forwarding service, wherein N tables are to be searched to execute the M forwarding services, wherein a set comprising preset performance of the M forwarding services comprises Q elements, wherein the Q elements are a first element to a $Q^{th}$ element, and each element in the Q elements indicates one type of preset performance, and an $r^{th}$ element in the Q elements indicates that the preset performance is a $C_r\times$line rate, wherein M, N, Q, and r are positive integers, wherein $2\leq N$, $Q\leq m$, $r\leq Q$, and $0\leq C_r\leq 1$; and sending, by the controller, the M pieces of description information to a forwarding device;

wherein the forwarding device can perform the following, according to the M pieces of description information received from the controller:

generate Q pieces of simultaneous access information according to the M pieces of description information, wherein an rth piece of simultaneous access information in the Q pieces of simultaneous access information indicates whether every two tables in the N tables are to be accessed by a same forwarding service whose preset performance is the $C_r\times$line rate; and determine a memory location where the N tables are to be stored in at least one memory of the forwarding device.

9. The method according to claim 8, further comprising:
receiving, by the controller, a first message sent by the forwarding device, wherein the first message is used to announce that the forwarding device determines that a $j^{th}$ table in the N tables cannot be stored in the at least one memory of the forwarding device, wherein j is a positive integer, and j is less than or equal to N.

10. The method according to claim 9, wherein the method further comprises:
generating, by the controller, a second message, wherein the second message is used to instruct the forwarding device to store the $j^{th}$ table in the N tables;

sending, by the controller, the second message to the forwarding device, so that the forwarding device operates in a best-effort mode and determines that the $j^{th}$ table in the N tables is to be stored in a second memory in the at least one memory; and receiving, by the controller, a third message sent by the forwarding device, wherein the third message is used to announce actual performance of a forwarding service supported by the $j^{th}$ table in the N tables when the forwarding device determines that the $j^{th}$ table in the N tables is to be stored in the second memory.

11. A forwarding device, comprising a processor and a memory coupled to the processor, the memory storing instructions when executed by the processor cause the forwarding device to:
  receive M pieces of description information sent by a controller, wherein the M pieces of description information are in a one-to-one correspondence with M forwarding services, each piece of description information in the M pieces of description information comprising a preset performance of a corresponding forwarding service and an identifier of a table to be searched to execute the corresponding forwarding service, wherein N tables are to be searched to execute the M forwarding services, wherein a set comprising preset performance of the M forwarding services comprises Q elements, wherein the Q elements are a first element to a $Q^{th}$ element, and wherein each element in the Q elements indicates one type of preset performance, and an $r^{th}$ element in the Q elements indicates that the preset performance is a $C_r \times$line rate, wherein M, N, Q, and r are positive integers, and $2 \leq N$, $Q \leq M$, $r \leq Q$, and $0 \leq C_r \leq 1$;
  generate Q pieces of simultaneous access information according to the M pieces of description information, wherein an $r^{th}$ piece of simultaneous access information in the Q pieces of simultaneous access information indicates whether every two tables in the N tables are to be accessed by a same forwarding service whose preset performance is the $C_r \times$line rate;
  determine, according to the Q pieces of simultaneous access information, a memory location where the N tables are to be stored in at least one memory of the forwarding device; and
  store the N tables at the memory location in the at least one memory.

12. The forwarding device according to claim 11, wherein the Q pieces of simultaneous access information are Q N×N matrices, and an element of each N×N matrix in the Q N×N matrices is 1 or 0; and
  if an element in an $i^{th}$ row and a $j^{th}$ column of an $r^{th}$ N×N matrix in the Q N×N matrices is 1, it indicates that both an $i^{th}$ table in the N tables and a $j^{th}$ table in the N tables are to be accessed by at least one forwarding service that is in the M forwarding services and whose preset performance is the $C_r \times$line rate; or
  if an element in an $i^{th}$ row and a $j^{th}$ column of an $r^{th}$ N×N matrix in the Q N×N matrices is 0, it indicates that not both an $i^{th}$ table in the N tables and a $j^{th}$ table in the N tables are to be accessed by any forwarding service that is in the M forwarding services and whose preset performance is the $C_r \times$line rate, wherein i and j are positive integers, and both i and j are less than or equal to N.

13. The forwarding device according to claim 12, wherein the forwarding device is configured to determine the memory location where the N tables are to be stored in the at least one memory by:
  determining that each table in the N tables is to be stored in the at least one memory of the forwarding device; and
  wherein the forwarding device is configured to determine that an $m^{th}$ table in the N tables is to be stored in the at least one memory of the forwarding device by:
  determining whether each table in the N tables has been stored in a first memory in the at least one memory, wherein a 1×N matrix is used to indicate whether each table in the N tables has been stored in the first memory, and specifically, an element in a first column to an element in an $N^{th}$ column of the 1×N matrix are respectively used to indicate whether a first table in the N tables to an $N^{th}$ table in the N tables have been stored in the first memory; and an element in an $i^{th}$ column of the 1×N matrix is used to indicate whether the $i^{th}$ table in the N tables has been stored in the first memory, and if the element in the $i^{th}$ column of the 1×N matrix is 1, it indicates that the $i^{th}$ table in the N tables has been stored in the first memory, or if the element in the $i^{th}$ column of the 1×N matrix is 0, it indicates that the $i^{th}$ table in the N tables has not been stored in the first memory;
  performing an AND operation on an element in an $m^{th}$ row of each N×N matrix in the Q N×N matrices and a corresponding element in the 1×N matrix, and determine a quantity of results that are 1, wherein a quantity of 1s in results of AND operations performed between elements in an $m^{th}$ row of the $r^{th}$ N×N matrix in the Q N×N matrices and corresponding elements in the 1×N matrix is $P_r$; and
  determining, based on $\max((P_1+1) \times C_1 \times A, (P_Q+1) \times C_Q \times A) \leq B$, that the $m^{th}$ table in the N tables is to be stored in the first memory;
  wherein m is a positive integer less than or equal to N, $P_r$ is a nonnegative integer, and $P_r < N$; and A and B are positive numbers; and
  wherein A indicates bandwidth to be occupied by a forwarding service whose actual performance is a line rate, and B indicates maximum bandwidth that can be provided by the first memory.

14. The forwarding device according to claim 11, wherein the forwarding device is further configured to:
  generate a first message when it is determined that an $a^{th}$ table in the N tables cannot be stored in the at least one memory, wherein the first message is used to announce that the forwarding device determines that the $a^{th}$ table in the N tables cannot be stored in the at least one memory; and
  send, to the controller, the first message, wherein a is a positive integer, and a is less than or equal to N.

15. The forwarding device according to claim 14, wherein the forwarding device is further configured to:
  receive a second message sent by the controller, wherein the second message is used to instruct the forwarding device to store the $a^{th}$ table in the N tables;
  operate in a best-effort mode according to the second message, and determine that the $a^{th}$ table in the N tables is to be stored in a second memory in the at least one memory;
  generate a third message, wherein the third message is used to announce actual performance of a forwarding service supported by the $a^{th}$ table in the N tables when it is determined that the $a^{th}$ table in the N tables is to be stored in the second memory; and
  send, to the controller, the third message.

16. A controller, comprising a processor and a memory coupled to the processor, the memory storing instructions when executed by the processor cause the controller to:
  generate M pieces of description information, wherein the M pieces of description information are in a one-to-one correspondence with M forwarding services, each piece of description information in the M pieces of description information comprises preset performance of a corresponding forwarding service and an identifier of a table to be searched to execute the corresponding forwarding service, and N tables are to be searched to execute the M forwarding services; a set comprising preset performance of the M forwarding services comprises Q elements, the Q elements are a first element to a $Q^{th}$ element, and each element in the Q elements indicates one type of preset performance; and an $r^{th}$ element in the Q elements indicates that the preset performance is a $C_r \times$line rate, M, N, Q, and r are positive integers, $2 \leq N$, $Q \leq M$, $r \leq Q$, and $0 \leq C_r \leq 1$; and send, to a forwarding device, the M pieces of description information;

wherein the forwarding device can perform the following, according to the M pieces of description information received from the controller:

generate Q pieces of simultaneous access information according to the M pieces of description information, wherein an rth piece of simultaneous access information in the Q pieces of simultaneous access information indicates whether every two tables in the N tables are to be accessed by a same forwarding service whose preset performance is the $C_r \times$line rate; and determine a memory location where the N tables are to be stored in at least one memory of the forwarding device.

17. The controller according to claim 16, wherein the controller is further configured to:

receive a first message sent by the forwarding device, wherein the first message is used to announce that the forwarding device determines that a $j^{th}$ table in the N tables cannot be stored in the at least one memory of the forwarding device, wherein j is a positive integer, and j is less than or equal to N.

18. The controller according to claim 17, wherein the controller is further configured to:

generate a second message, wherein the second message is used to instruct the forwarding device to store the $j^{th}$ table in the N tables;

send, to the forwarding device, the second message, so that the forwarding device operates in a best-effort mode and determines that the $j^{th}$ table in the N tables is to be stored in a second memory in the at least one memory; and receive a third message sent by the forwarding device, wherein the third message is used to announce actual performance of a forwarding service supported by the $j^{th}$ table in the N tables when the forwarding device determines that the $j^{th}$ table in the N tables is to be stored in the second memory.

* * * * *